US011136118B2

(12) United States Patent
Fischer et al.

(10) Patent No.: US 11,136,118 B2
(45) Date of Patent: Oct. 5, 2021

(54) SIX DEGREE OF FREEDOM AERIAL VEHICLE CONTROL METHODS RESPONSIVE TO MOTOR OUT SITUATIONS

(71) Applicant: Amazon Technologies, Inc., Seattle, WA (US)

(72) Inventors: Sebastian Robin Fischer, Seattle, WA (US); David Friedman, Seattle, WA (US); Marco Antonio De Barros Ceze, Seattle, WA (US); Louis Leroi LeGrand, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 16/118,354

(22) Filed: Aug. 30, 2018

(65) Prior Publication Data

US 2020/0070972 A1 Mar. 5, 2020

(51) Int. Cl.
*B64C 11/46* (2006.01)
*B64C 39/02* (2006.01)
(Continued)

(52) U.S. Cl.
CPC ............ *B64C 39/024* (2013.01); *B64C 11/46* (2013.01); *B64C 27/20* (2013.01); *B64C 27/26* (2013.01); *B64C 29/02* (2013.01); *B64C 39/062* (2013.01); *G05D 1/0055* (2013.01); *G05D 1/0816* (2013.01); *G05D 1/101* (2013.01); *B64C 2201/028* (2013.01); *B64C 2201/042* (2013.01);
(Continued)

(58) Field of Classification Search
USPC ............................................................ 701/3
See application file for complete search history.

(56) References Cited

U.S. PATENT DOCUMENTS

| 3,350,035 A | 10/1967 | Schlieben |
| 2007/0023581 A1 | 2/2007 | La |

(Continued)

FOREIGN PATENT DOCUMENTS

| CN | 103625640 A | 3/2014 |
| DE | 102009033821 A1 | 1/2011 |

(Continued)

OTHER PUBLICATIONS

International Search Report and Written Opinion dated Dec. 3, 2019, issued in corresponding International Application No. PCT/US2019/048531, 14 pages.

(Continued)

*Primary Examiner* — James M McPherson
(74) *Attorney, Agent, or Firm* — Athorus, PLLC

(57) ABSTRACT

Systems and methods to control aerial vehicles in degraded operational states are described. For example, for an aerial vehicle having six propulsion mechanisms arranged around a fuselage, one or more modified control schemes may be implemented to maintain control and navigation of the aerial vehicle responsive to a motor out situation, such as a failure of one propulsion mechanism. The modified control schemes may seek to emulate normal operation of a quadcopter, and/or may seek to utilize all remaining propulsion mechanisms to maintain controllability of the aerial vehicle in all six degrees of freedom of movement.

18 Claims, 14 Drawing Sheets

(51) Int. Cl.
*B64C 27/20* (2006.01)
*B64C 27/26* (2006.01)
*B64C 29/02* (2006.01)
*B64C 39/06* (2006.01)
*G05D 1/00* (2006.01)
*G05D 1/08* (2006.01)
*G05D 1/10* (2006.01)

(52) U.S. Cl.
CPC .. *B64C 2201/104* (2013.01); *B64C 2201/128* (2013.01); *B64C 2201/165* (2013.01)

(56) References Cited

U.S. PATENT DOCUMENTS

| | | | |
|---|---|---|---|
| 2011/0042509 | A1 | 2/2011 | Bevirt et al. |
| 2013/0134254 | A1* | 5/2013 | Moore ................ B64D 1/16 244/17.11 |
| 2016/0311528 | A1* | 10/2016 | Nemovi ............... B64C 27/80 |
| 2017/0158342 | A1 | 6/2017 | Ishii et al. |
| 2017/0313433 | A1 | 11/2017 | Ozaki |
| 2018/0229839 | A1 | 8/2018 | Kimchi et al. |
| 2019/0036732 | A1* | 1/2019 | Dormiani ............ B64C 39/04 |
| 2019/0135426 | A1* | 5/2019 | Bailie .................. B64C 3/56 |
| 2019/0144097 | A1* | 5/2019 | Benson ................ B64C 1/065 244/131 |
| 2019/0168866 | A1* | 6/2019 | Tovkach .............. B64C 27/08 |
| 2019/0256191 | A1* | 8/2019 | Suzuki ................ B64C 27/08 |
| 2019/0291862 | A1* | 9/2019 | Lyasoff .............. G05D 1/102 |
| 2020/0033851 | A1* | 1/2020 | Hajimiri ............. G05D 1/0027 |
| 2020/0105149 | A1* | 4/2020 | Mahkonen .......... B64C 39/024 |
| 2020/0172257 | A1* | 6/2020 | Bhat .................. B64C 11/48 |

FOREIGN PATENT DOCUMENTS

| | | |
|---|---|---|
| DE | 102010040770 A1 | 3/2012 |
| EP | 1775214 A1 | 4/2007 |
| EP | 2616333 B1 | 11/2016 |
| EP | 3176084 B1 | 10/2019 |
| GB | 2462452 B | 2/2011 |
| WO | 2001030652 A1 | 5/2001 |
| WO | 2010015866 A2 | 2/2010 |
| WO | 2013039853 A1 | 3/2013 |
| WO | 2013124852 A1 | 8/2013 |
| WO | 2015150529 A1 | 10/2015 |
| WO | 2016193884 A1 | 12/2016 |

OTHER PUBLICATIONS

International Search Report and Written Opinion for PCT/US2018/018253, dated Apr. 13, 2018, 9 pages.

Andrew Rosenblum et al, "The Jets of the Future," May 1, 2012, Retrieved from the Internet on Mar. 27, 2018: URL: https://www.popsci.com/technology/article/2012-04/jets-future, pp. 1-9.

Dirtflare, "Ring Wing VTOL!!!," Specifications Ring Wing VTOL!!!, Aug. 1, 2016, Retrieved from the Internet on Mar. 22, 2018: URL: https://www.simpleplanes.com/a/Mo2vSy/Ring-Wing-VTOL, pp. 1-2.

* cited by examiner

SIX DEGREE OF FREEDOM AERIAL VEHICLE CONTROL METHODS RESPONSIVE TO MOTOR OUT SITUATIONS

CROSS-REFERENCE TO RELATED APPLICATION

This application is related to U.S. application Ser. No. 15/435,121, filed Feb. 16, 2017, entitled "Six Degree of Freedom Aerial Vehicle with a Ring Wing," which is incorporated herein by reference in its entirety.

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. Likewise, unmanned ground based units are often used in materials handling facilities to autonomously transport inventory within the facility. While there are many beneficial uses of these vehicles, balancing the tightly coupled vehicle performance parameters of stability, maneuverability, and energy efficiency introduces design complexities of the UAVs. For example, due to current design limitations, design tradeoffs exist between optimizing UAVs for high agility versus high energy efficiency. Likewise, aerial vehicles are designed to only operate with four degrees of freedom—pitch, yaw, roll, and heave. In addition, aerial vehicles are generally designed assuming a fully operational state. Accordingly, there is a need for control systems and methods to maintain control and safety of aerial vehicles even in degraded operational states.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
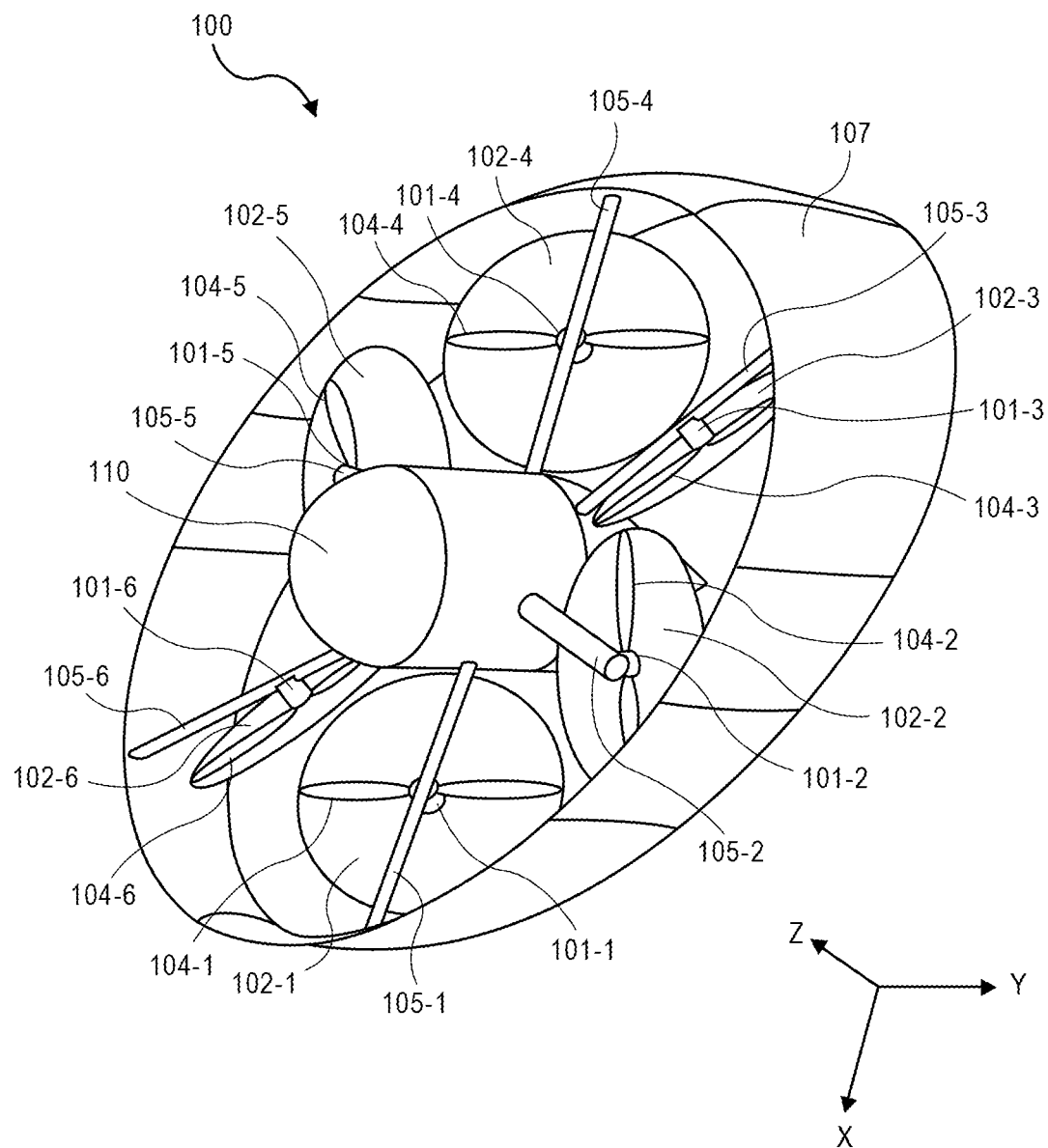
FIGS. 1-4 illustrate various views of an aerial vehicle with a substantially circular shaped ring wing, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes aerial vehicles, such as UAVs (e.g., quad-copters, hex-copters, hepta-copters, octa-copters) that can operate in a vertical takeoff and landing (VTOL) orientation or in a horizontal flight orientation. Likewise, when the aerial vehicle is in a VTOL orientation, it can transition independently in any of the six degrees of freedom. Specifically, as described herein, the aerial vehicles may efficiently rotate in any of the three degrees of freedom of rotation (pitch, yaw, and roll) and/or may efficiently move in any of the three degrees of freedom of translation (surge, heave, and sway). For example, the aerial vehicle may include six propulsion mechanisms that are oriented at different angles and therefore, together, can provide thrust in the vertical direction and/or the horizontal direction when the aerial vehicle is in a VTOL orientation.

As discussed further below, a ring wing is included on the aerial vehicle that surrounds the propulsion mechanisms of the aerial vehicle and provides both protection around the propulsion mechanisms and lift when the aerial vehicle is in the horizontal flight orientation and navigating in a substantially horizontal direction.

In addition, responsive to degraded functional states of aerial vehicles such as motor out situations, the aerial vehicles described herein may implement one or more modified control methods or schemes to maintain control of the aerial vehicles and land the aerial vehicles at safe landing locations. In one example embodiment, an aerial vehicle that has detected a failed propulsion mechanism may implement a modified control scheme that emulates operation of a quad-copter. In another example embodiment, an aerial vehicle that has detected a failed propulsion mechanism may implement a modified control scheme that utilizes the remaining propulsion mechanisms to continue flight and maintain control of the aerial vehicle until a safe landing location is reached.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using an aerial vehicle. For example, an item carried by a payload of an aerial vehicle discussed herein may be ordered by a customer of an electronic commerce website and aerially delivered by the aerial vehicle to a delivery location.

FIG. 1 illustrates a view of an aerial vehicle 100 with a ring wing that is substantially cylindrical in shape and that surrounds a plurality of propulsion mechanisms, in accordance with disclosed implementations. The aerial vehicle 100 includes six motors 101-1, 101-2, 101-3, 101-4, 101-5, and 101-6 and corresponding propellers 104-1, 104-2, 104-3, 104-4, 104-5, and 104-6 spaced about the fuselage 110 of the aerial vehicle 100. The propellers 104 may be any form of propeller (e.g., graphite, carbon fiber) and of any size. For example, the propellers may be 10 inch-12-inch diameter carbon fiber propellers.

The form and/or size of some of the propellers may be different than other propellers. Likewise, the motors 101 may be any form of motor, such as a DC brushless motor, and may be of a size sufficient to rotate the corresponding propeller. Likewise, in some implementations, the size and/or type of some of the motors 101 may be different than other motors 101. In some implementations, the motors may be rotated in either direction such that the force generated by the propellers may be either a positive force, when rotating in a first direction, or a negative force, when rotating in the second direction. Alternatively, or in addition thereto, the pitch of the blades of a propeller may be variable. By varying the pitch of the blades, the force generated by the propeller may be altered to either be in a positive direction or a negative direction. Still further, in some implementations, the pitch of the blades may be adjusted such that they are aligned with the direction of travel of the aerial vehicle and thus provide significantly less drag if they are not rotating.

Each pair of motors 101 and corresponding propellers 104 will be referred to herein collectively as a propulsion mechanism 102, such as propulsion mechanisms 102-1, 102-2, 102-3, 102-4, 102-5, and 102-6. Likewise, while the example illustrated in FIG. 1 describes the propulsion mechanisms 102 as including motors 101 and propellers 104, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation) or any position therebetween.

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

The aerial vehicle 100 also includes a ring wing 107 having a substantially cylindrical shape that extends around and forms the perimeter of the aerial vehicle 100. In the illustrated example, the ring wing is substantially circular in shape and tapers toward the bottom of the aerial vehicle. The ring wing 107 has an airfoil shape to produce lift when the aerial vehicle is oriented as illustrated in FIG. 1 and moving in a direction that is substantially horizontal. As illustrated, and discussed further below, the ring wing is positioned at an angle with respect to the fuselage 110 such that the lower part of the ring wing acts as a front wing as it is positioned toward the front of the aerial vehicle when oriented as shown and moving in a horizontal direction. The top of the ring wing, which has a longer chord length than the bottom portion of the ring wing 107, is positioned farther back and thus acts as a rear wing.

The ring wing is secured to the fuselage 110 by motor arms 105. In the illustrated example, each of motors arms 105-1, 105-2, 105-3, 105-4, 105-5, and 105-6 are coupled to the fuselage 110 at one end, extend from the fuselage 110 and couple to the ring wing 107 at a second end, thereby securing the ring wing 107 to the fuselage 110.

The fuselage 110, motor arms 105, and ring wing 107 of the aerial vehicle 100 may be formed of any one or more suitable materials, such as graphite, carbon fiber, and/or aluminum.

Each of the propulsion mechanisms 102 are coupled to a respective motor arm 105 such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102 is coupled at an approximate mid-point of the respective motor arm 105 between the fuselage 110 and the ring wing 107. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces, and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

The angle of orientation of each of the propulsion mechanisms 102-1, 102-3, 102-4, and 102-6 may vary for different implementations. Likewise, in some implementations, the offset of the propulsion mechanisms 102-1, 102-3, 102-4, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the third motor arm 105-2 and oriented toward propulsion mechanism 102-3. Finally, propulsion mechanism 102-4 is oriented approximately thirty degrees in the first direction about the fourth motor arm 105-4 and toward propulsion mechanism 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

Figure 2:
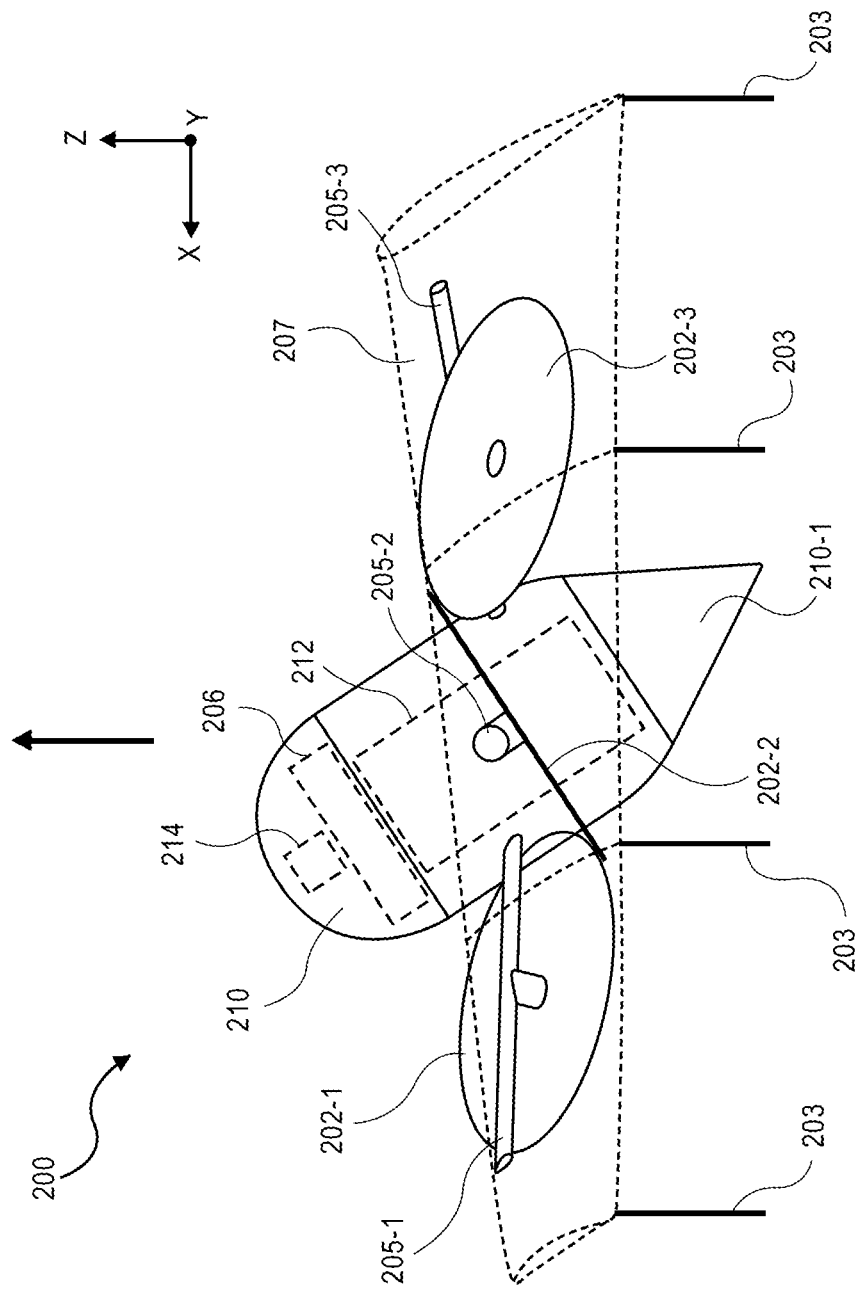

FIG. 2 illustrates a side view of the aerial vehicle 200 oriented for vertical takeoff and landing (VTOL), in accordance with disclosed implementations. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms, such as motor arms 205-1, 205-2, and 205-3, and the ring wing 207 are aligned approximately horizontally and in the same plane. In this orientation, each of the propulsion mechanisms are offset or angled with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the aerial vehicle 200 is oriented for VTOL, as illustrated in FIG. 2. In this example, the fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

The aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to store one or more components of the aerial vehicle, such as the aerial vehicle control system 214, power module 206, and/or a payload 212 that is transported by the aerial vehicle. The aerial vehicle control system 214 is discussed further below. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, and the payload engagement module 210-1.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The payload 212 may be any payload that is to be transported by the aerial vehicle. In some implementations, the aerial vehicle may be used to aerially deliver items ordered by customers for aerial delivery and the payload may include one or more customer ordered items.

For example, a customer may order an item from an electronic commerce website and the item may be delivered to a customer specified delivery location using the aerial vehicle 200.

In some implementations, the fuselage 210 may include a payload engagement module 210-1. For example, the payload engagement module 210-1 may be a hinged portion of the fuselage 210 that can rotate between an open position, in which the interior of the fuselage is accessible so that the payload 212 may be added to or removed from the fuselage, and a closed position, as illustrated in FIG. 2, so that the payload 212 is secured within the interior of the fuselage.

Figure 3:
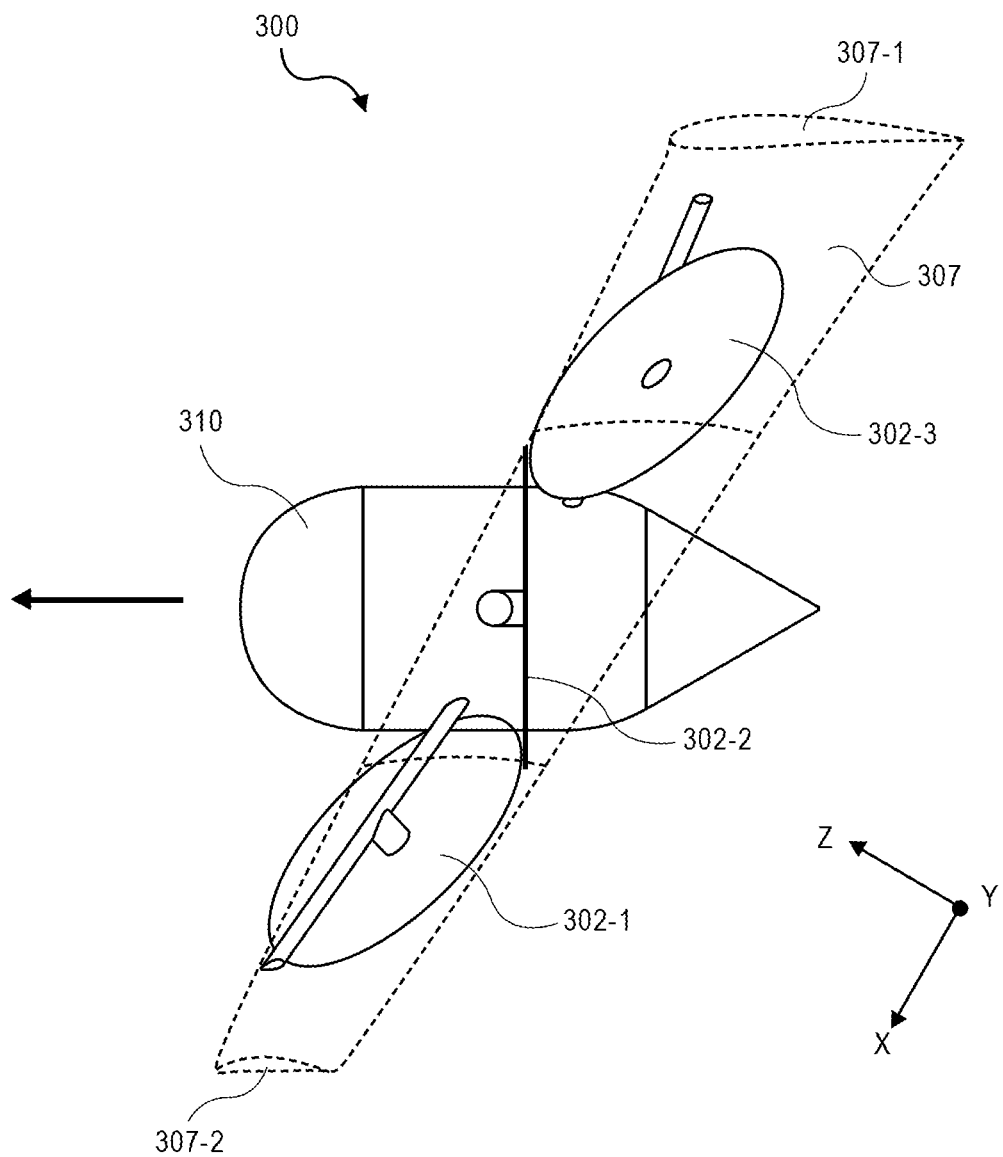

FIG. 3 is a side view of an aerial vehicle 300 with a ring wing 307, in accordance with disclosed implementations. The aerial vehicle 300 corresponds to the aerial vehicle 100 discussed in FIG. 1 and aerial vehicle 200 discussed in FIG. 2. As illustrated, when the aerial vehicle is oriented for horizontal flight, as illustrated in FIG. 3, the fuselage 310 is oriented horizontally and two of the propulsion mechanisms, propulsion mechanism 302-2 and the propulsion mechanism on the opposing side of the fuselage and illustrated in FIG. 1, are oriented to produce thrust in a substantially horizontal direction. In comparison, the other propulsion mechanisms, such as propulsion mechanisms 302-1 and 302-3, are not oriented to produce forces in substantially the horizontal direction. During horizontal flight, the propulsion mechanisms, such as propulsion mechanisms 302-1 and 302-3, may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind and energy produced from the rotation may be used to charge the power module of the aerial vehicle 300.

The ring wing 307 is angled such that the lower portion 307-2 of the ring wing is positioned ahead of the upper portion 307-1 of the ring wing 307. The leading wing, lower portion 307-2, produces a much higher lift per square inch than the rear wing, upper portion 307-1, and the chord length of the lower portion 307-2 is less than the chord length of the upper portion 307-1. Likewise, as illustrated, the upper portion 307-1 of the ring wing has a different camber than the lower portion 307-2. The chord length and camber transition from that illustrated along the upper portion 307-1 to the lower portion 307-2. While the sides of the ring wing provide some lift, at the midpoint of each side, there is minimal lift produced by the ring wing 307.

In addition to providing lift, the ring wing 307 provides a protective barrier or shroud that surrounds the propulsion mechanisms of the aerial vehicle 300. The protective barrier of the ring wing 307 increases the safety of the aerial vehicle. For example, if the aerial vehicle comes into contact with another object, there is a higher probability that the object will contact the ring wing, rather than a propulsion mechanism.

Figure 4:
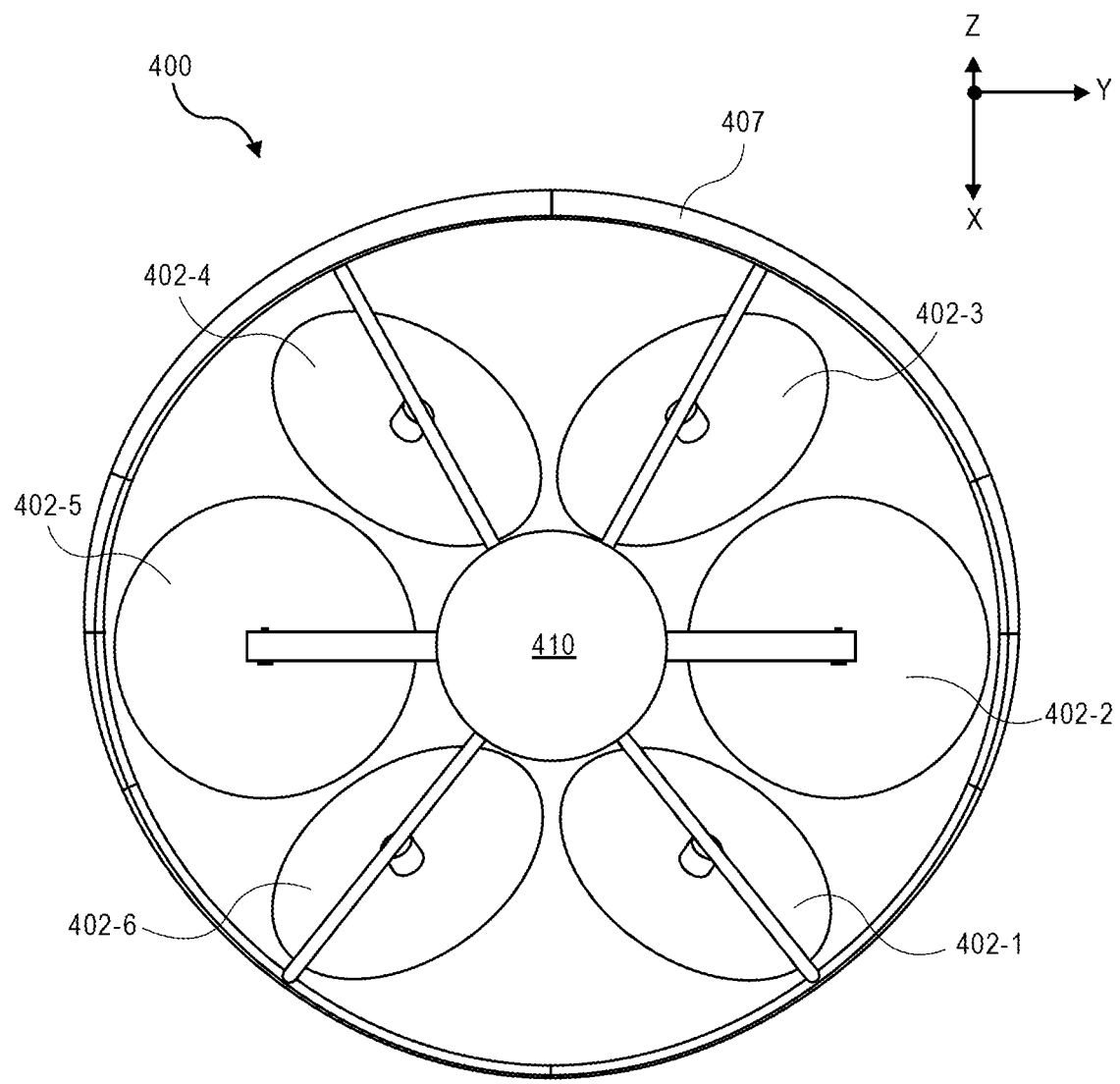

FIG. 4 is a front-on view of an aerial vehicle 400 with a ring wing 407, according to disclosed implementations. The aerial vehicle 400 corresponds to aerial vehicle 100 of FIG. 1, aerial vehicle 200 of FIG. 2, and aerial vehicle 300 of FIG. 3. As discussed above with respect to FIG. 3, when the aerial vehicle is oriented for horizontal flight, as illustrated in FIGS. 3 and 4, the fuselage 410 is oriented in the direction of travel, the ring wing 407 is oriented in the direction of travel such that it will produce a lifting force, and propulsion mechanisms 402-2 and 402-5, which are on opposing sides of the fuselage 410, are aligned to produce forces in the substantially horizontal direction to propel or thrust the aerial vehicle horizontally. The other propulsion mechanisms 402-1, 402-3, 402-4, and 402-6 are offset and may be disabled, used to produce maneuverability forces, and/or allowed to freely rotate and produce energy that is used to charge a power module of the aerial vehicle 400. By increasing the thrust produced by each of the propulsion mechanisms 402-2 and 402-5, the horizontal speed of the aerial vehicle increases. Likewise, the lifting force from the ring wing 407 also increases. In some implementations, as discussed further below, one or more ailerons may be included on the surface of the ring wing and used to control the aerial navigation of the aerial vehicle during horizontal flight.

As discussed below, to transition the aerial vehicle from a VTOL orientation, as illustrated in FIG. 2, to a horizontal flight orientation, as illustrated in FIGS. 3 and 4, forces generated by each of the propulsion mechanisms 402 will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne.

In contrast, as discussed below, when the aerial vehicle is to transition from a horizontal flight orientation to a VTOL orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the six propulsion mechanisms 402 are utilized to maintain flight of the aerial vehicle 400.

As illustrated in FIGS. 1-4, each of the propulsion mechanisms 402 are positioned in approximately the same plane that is substantially aligned with the ring wing. Likewise, each propulsion mechanism 402 is spaced approximately sixty degrees from each other around the fuselage 410, such that the propulsion mechanisms are positioned at approximately equal distances with respect to one another and around the fuselage 410 of the aerial vehicle 400. For example, the second propulsion mechanism 402-2 and the fifth propulsion mechanism 402-5 may each be positioned along the X axis. The third propulsion mechanism 402-3 may be positioned at approximately sixty degrees from the X axis and the fourth propulsion mechanism 402-4 may be positioned approximately one-hundred and twenty degrees from the X axis. Likewise, the first propulsion mechanism 402-1 and the sixth propulsion mechanism 402-6 may likewise be positioned approximately sixty degrees and approximately one-hundred and twenty degrees from the X axis in the negative direction.

In other implementations, the spacing between the propulsion mechanisms may be different. For example, propulsion mechanisms 402-1, 402-3, and 402-5, which are oriented in the first direction, may each be approximately equally spaced 120 degrees apart and propulsion mechanisms 402-2, 402-4, and 402-6, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 402-1, 402-3, and 402-5 oriented in the first direction, may be positioned at approximately zero degrees, approximately 120 degrees, and approximately 240 degrees around the perimeter of the aerial vehicle with respect to the X axis, and the propulsion mechanisms 402-2, 402-4, and 402-6, oriented in the second direction, may be positioned at approximately 10 degrees, approximately 130 degrees, and approximately 250 degrees around the perimeter of the aerial vehicle 400 with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIGS. 1-4 discuss rotating the propulsion mechanisms approximately thirty degrees about each respective motor arm and that the ring wing is offset approximately thirty degrees with respect to the fuselage, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in VTOL orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if lifting force of the aerial vehicle when the aerial vehicle is in the VTOL orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 402-1, 402-3, and 402-5 may each be oriented approximately fifteen degrees in the first direction and propulsion mechanisms 402-2, 402-4, and 402-6 may each be oriented approximately twenty-five degrees in the second direction. In still other examples, pairs of propulsion mechanisms may have different orientations than other pairs of propulsion mechanisms. For example, propulsion mechanisms 402-1 and 402-6 may each be oriented approximately thirty degrees in the first direction and second direction, respectively, toward one another, propulsion mechanisms 402-3 and 402-2 may each be oriented approximately forty-five degrees in the first direction and second direction, respectively, toward one another, and propulsion mechanisms 402-5 and 402-4 may each be oriented approximately forty-five degrees in the first direction and second direction, respectively, toward one another.

As discussed below, by orienting propulsion mechanisms partially toward one another in pairs, as illustrated, the lateral or horizontal forces generated by the pairs of propulsion mechanisms, when producing the same amount of force, will cancel out such that the sum of the forces from the pair is only in a substantially vertical direction (Z direction), when the aerial vehicle is in the VTOL orientation. Likewise, as discussed below, if one propulsion mechanism of the pair produces a force larger than a second propulsion mechanism, a lateral or horizontal force will result in the X direction and/or the Y direction, when the aerial vehicle is in the VTOL orientation. A horizontal force produced from one or more of the pairs of propulsion mechanisms enables the aerial vehicle to translate in a horizontal direction and/or yaw without altering the pitch of the aerial vehicle, when the aerial vehicle is in the VTOL orientation. Producing lateral forces by multiple pairs of propulsion mechanisms 402 enables the aerial vehicle 400 to operate independently in any of the six degrees of freedom (surge, sway, heave, pitch, yaw, and roll). As a result, the stability and maneuverability of the aerial vehicle 400 is increased.

While the implementations illustrated in FIGS. 1-4 include six arms that extend radially from a central portion of the aerial vehicle and are coupled to the ring wing, in other implementations, there may be fewer or additional arms. For example, the aerial vehicle may include support arms that extend between the arms 105 and provide additional support to the aerial vehicle. As another example, not all of the motor arms may extend to and couple with the ring wing.

Figure 5:
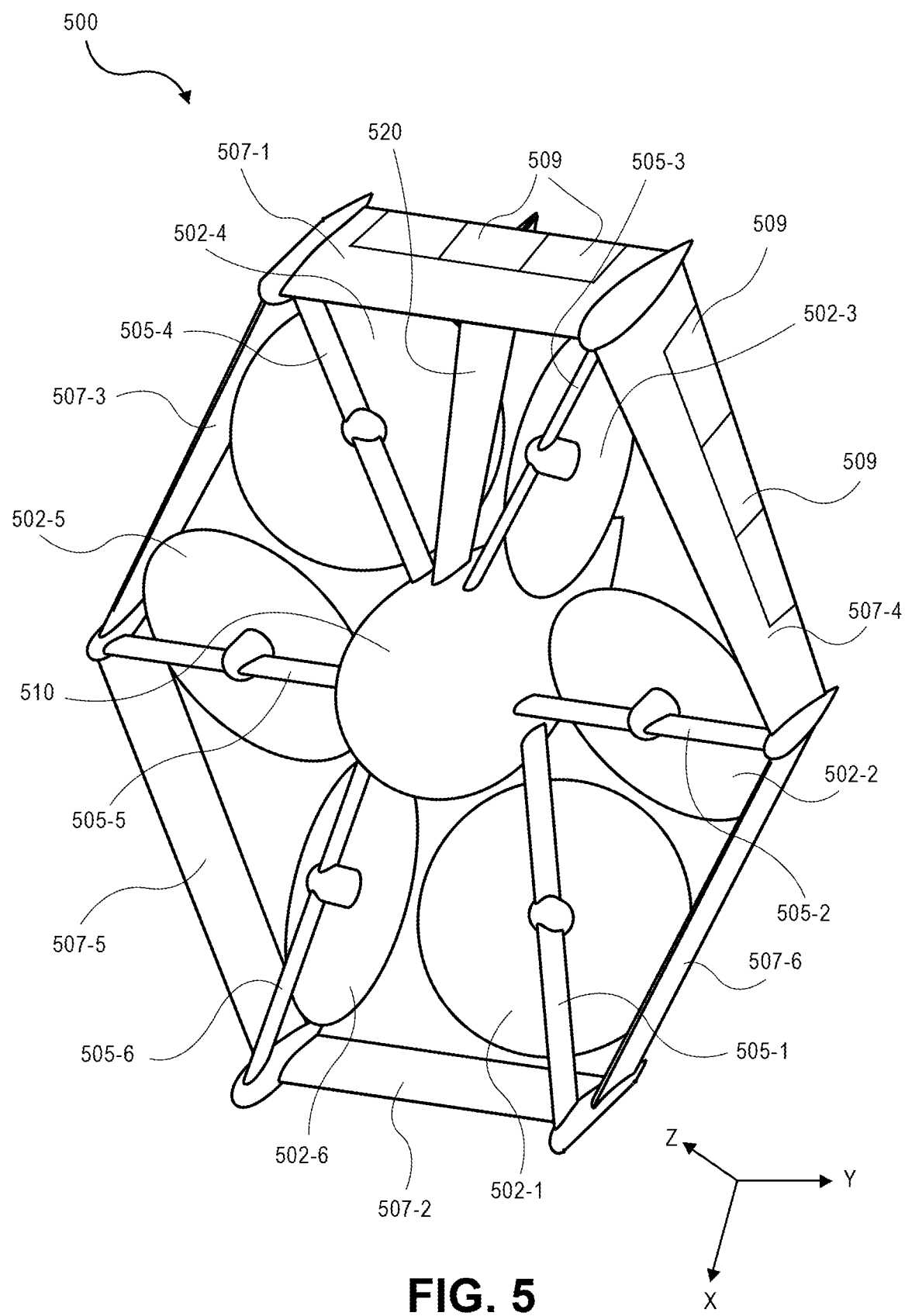
FIG. 5 illustrates a view of an aerial vehicle with a substantially hexagonal shaped ring wing, in accordance with disclosed implementations.

FIG. 5 illustrates a view of an aerial vehicle 500 with a ring wing that is substantially hexagonal in shape and that surrounds a plurality of propulsion mechanisms, according to disclosed implementations. Similar to the aerial vehicle discussed with respect to FIGS. 1-4, the aerial vehicle 500 includes six propulsion mechanisms 502-1, 502-2, 502-3, 502-4, 502-5, and 502-6 spaced about the fuselage 510 of the aerial vehicle 500. As discussed above, while the propulsion mechanisms 502 may include motors 501 and propellers 504, in other implementations, other forms of propulsion may be utilized as the propulsion mechanisms 502. For example, one or more of the propulsion mechanisms 502 of the aerial vehicle 500 may utilize fans, jets, turbojets, turbo fans, jet engines, and/or the like to maneuver the aerial vehicle. Generally described, a propulsion mechanism 502, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 502-1, 502-2, 502-3, 502-4, 502-5, and 502-6) may be configured such that their individual orientations may be dynamically modified (e.g., change from vertical to horizontal flight orientation) or any position therebetween.

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

In this implementation, the aerial vehicle 500 also includes a ring wing 507 having a substantially hexagonal shape that extends around and forms the perimeter of the aerial vehicle 500. In the illustrated example, the ring wing has six segments 507-1, 507-2, 507-3, 507-4, 507-5, and 507-6 that are joined at adjacent ends to form the ring wing 507 around the aerial vehicle 500. Each segment of the ring wing 507 has an airfoil shape to produce lift when the aerial vehicle is oriented as illustrated in FIG. 5 and moving in a direction that is substantially horizontal. As illustrated, and discussed further below, the ring wing is positioned at an angle with respect to the fuselage 510 such that the lower segment 507-2 of the ring wing acts as a front wing as it is positioned toward the front of the aerial vehicle when oriented as shown and moving in a horizontal direction. The upper segment 507-1 of the ring wing, which has a longer chord length than the lower segment 507-2 of the ring wing 507, is positioned farther back and thus acts as a rear wing.

The ring wing 507 is secured to the fuselage 510 by motor arms 505. In this example, all six motor arms 505-1, 505-2, 505-3, 505-4, 505-5, and 505-6 are coupled to the fuselage at one end, extend from the fuselage 510 and couple to the ring wing 507 at a second end, thereby securing the ring wing 507 to the fuselage. In other implementations, less than all of the motor arms may extend from the fuselage 510 and couple to the ring wing 507. For example, motor arms 505-2 and 505-5 may be coupled to the fuselage 510 at one end and extend outward from the fuselage but not couple to the ring wing 507.

In some implementations, the aerial vehicle may also include one or more stabilizer fins 520 that extend from the fuselage 510 to the ring wing 507. The stabilizer fin 520 may also have an airfoil shape. In the illustrated example, the stabilizer fin 520 extends vertically from the fuselage 510 to the ring wing 507. In other implementations, the stabilizer fin may be at other positions. For example, the stabilizer fin may extend downward from the fuselage between motor arm 505-1 and motor arm 505-6.

In general, one or more stabilizer fins may extend from the fuselage 510, between any two motor arms 505 and couple to an interior of the ring wing 507. For example, stabilizer fin 520 may extend upward between motor arms 505-3 and 505-4, a second stabilizer fin may extend from the fuselage and between motor arms 505-5 and 505-6, and a third stabilizer fin may extend from the fuselage and between motor arms 505-1 and 505-2.

Likewise, while the illustrated example shows the stabilizer fins extending from the fuselage 510 at one end and coupling to the interior of the ring wing 507 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 507, one or more stabilizer fins may extend from the interior of the ring wing 507, one or more stabilizer fins may extend from the fuselage 510, and/or one or more stabilizer fins may extend from the fuselage 510 and couple to the interior of the ring wing 507.

The fuselage 510, motor arms 505, stabilizer fin 520, and ring wing 507 of the aerial vehicle 500 may be formed of any one or more suitable materials, such as graphite, carbon fiber, and/or aluminum.

Each of the propulsion mechanisms 502 are coupled to a respective motor arm 505 such that the propulsion mechanism 502 is substantially contained within the perimeter of the ring wing 507. For example, propulsion mechanism 502-1 is coupled to motor arm 505-1, propulsion mechanism 502-2 is coupled to motor arm 505-2, propulsion mechanism 502-3 is coupled to motor arm 505-3, propulsion mechanism 502-4 is coupled to motor arm 505-4, propulsion mechanism 502-5 is coupled to motor arm 505-5, and propulsion mechanism 502-6 is coupled to motor arm 505-6. In the illustrated example, each propulsion mechanism 502-1, 502-2, 502-3, 502-4, 502-5, and 502-6 is coupled at an approximate mid-point of the respective motor arm 505-1, 505-2, 505-3, 505-4, 505-5, and 505-6 between the fuselage 510 and the ring wing 507. In other examples, propulsion mechanisms 502-2 and 502-5 may be coupled toward an end of the respective motor arm 505-2 and 505-5. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 510 or closer toward the ring wing 507).

As illustrated, the propulsion mechanisms 502 may be oriented at different angles with respect to each other. For example, propulsion mechanisms 502-2 and 502-5 are aligned with the fuselage 510 such that the force generated by each of propulsion mechanisms 502-2 and 502-5 is in-line or in the same direction or orientation as the fuselage.

In the illustrated example, the aerial vehicle 500 is oriented for horizontal flight such that the fuselage is oriented horizontally in the direction of travel. In such an orientation, the propulsion mechanisms 502-2 and 502-5 provide horizontal forces, also referred to herein as thrusting forces and act as thrusting propulsion mechanisms.

In comparison to propulsion mechanisms 502-2 and 502-5, each of propulsion mechanisms 502-1, 502-3, 502-4, and 502-6 are offset or angled with respect to the orientation of the fuselage 510. When the aerial vehicle 500 is oriented horizontally as shown in FIG. 5 for horizontal flight, the propulsion mechanisms 502-1, 502-3, 502-4, and 502-6 may be used as propulsion mechanisms, providing thrust in a non-horizontal direction to cause the aerial vehicle to pitch, yaw, roll, heave and/or sway. In other implementations, during horizontal flight, the propulsion mechanisms 502-1, 502-3, 502-4, and 502-6 may be disabled such that they do not produce any forces and the aerial vehicle 500 may be propelled aerially in a horizontal direction as a result of the lifting force from the aerodynamic shape of the ring wing 507 and the horizontal thrust produced by the thrusting propulsion mechanisms 502-2 and 502-5.

In some implementations, one or more segments of the ring wing 507 may include ailerons 509 that may be adjusted to control the aerial flight of the aerial vehicle 500. For example, one or more ailerons 509 may be included on the upper segment 507-1 of the ring wing 507 and/or one or more ailerons 509 may be included on the side segments 507-4 and/or 507-3. The ailerons 509 may be operable to control the pitch, yaw, and/or roll of the aerial vehicle during horizontal flight when the aerial vehicle 500 is oriented as illustrated in FIG. 5.

The angle of orientation of each of the propulsion mechanism 502-1, 502-2, 502-3, 502-4, 502-5, and 502-6 may vary for different implementations. Likewise, in some implementations, the offset of the propulsion mechanisms 502-1, 502-2, 502-3, 502-4, 502-5, and 502-6 may each be the same, with some oriented in one direction and some oriented in another direction, may each be oriented different amounts, and/or in different directions.

In the illustrated example of FIG. 5, each propulsion mechanism 502-1, 502-2, 502-3, 502-4, 502-5, and 502-6 may be oriented approximately thirty degrees with respect to the position of each respective motor arm 505-1, 505-2, 505-3, 505-4, 505-5, and 505-6. In addition, the direction of orientation of the propulsion mechanisms is such that pairs of propulsion mechanisms are oriented toward one another. For example, propulsion mechanism 502-1 is oriented approximately thirty degrees toward propulsion mechanism 502-6. Likewise, propulsion mechanism 502-2 is oriented approximately thirty degrees in a second direction about the third motor arm 505-2 and oriented toward propulsion mechanism 502-3. Finally, propulsion mechanism 502-4 is oriented approximately thirty degrees in the second direction about the fourth motor arm 505-4 and toward propulsion 502-5. As illustrated, propulsion mechanisms 502-3 and 502-6, which are on opposing sides of the fuselage 510, are aligned and oriented in a same first direction (in this example, horizontal). Propulsion mechanisms 502-2 and 502-5, which are on opposing sides of the fuselage 510, are aligned and oriented in a same second direction, which is angled compared to the first direction. Propulsion mechanisms 502-1 and 502-4, which are on opposing sides of the fuselage 510, are aligned and oriented in a same third direction, which is angled compared to the first direction and the second direction.

Various other features, variations, modifications, and/or example embodiments described herein with respect to FIGS. 1-4 may also be combined and/or incorporated into the aerial vehicle 500 as illustrated in FIG. 5.

During operation of example aerial vehicles, such as those illustrated and described with respect to FIGS. 1-5, various types of faults or failure modes may arise that result in degraded operational states of the aerial vehicles. For example, one or more of the propulsion mechanisms may no longer operate normally due to various types of faults, which may be referred to as motor out situations. In order to improve the reliability, safety, and operational capability of the aerial vehicles, the aerial vehicles may implement one or more modified control schemes in response to such faults in order to maintain flight of the aerial vehicles and land at safe landing locations.

The various types of faults that may result in motor out situations may include damage or loss of function of one or more propellers or propeller blades, damage or loss of function of one or more motors, damage or loss of function of one or more motor controllers that are each in communication with a corresponding motor and propeller, damage or loss of function between one or more motor controllers and a flight controller that is in communication with each of the motor controllers, loss of power or other electrical signals between two or more components of the aerial vehicle, or various other types of faults.

In addition, the various types of faults may be detected in various manners. For example, damage or loss of function of one or more propellers or propeller blades may be detected by comparison of actual values of motor revolutions per minute (rpm) and applied current with expected values of motor rpm and applied current, since a motor rotating with damaged or missing propellers or blades may draw different values of current than expected values while rotating at a particular motor rpm. In addition, damage or loss of function of one or more motors may be detected by comparison of measured rpm versus commanded rpm, or by measurements and/or calculations related to motor efficiency. Further, various faults of one or more propellers, blades, and/or motors may be detected by one or more motor controllers, which may be provided as feedback to the flight controller. Moreover, various faults of one or more motor controllers may be detected by the flight controller.

In further example embodiments, various other types of sensors may be used to detect one or more of the various types of faults that result in motor out situations. For example, the sensors may include imaging devices or cameras that can capture images of portions of propellers, blades, and/or motors, which images may be processed to determine damage or loss of function of one or more components. In addition, the sensors may include inertial measurement units, accelerometers, gyroscopes, or similar types of sensors that may detect changes to flight operations or navigation of the aerial vehicle that may be caused by one or more faults that result in motor out situations. Various other types of sensors may also detect aspects of flight, navigation, movement, or operation of various components of the aerial vehicles to identify one or more faults. Moreover, the various types of faults may be detected by various combinations of methods described herein.

Figure 6:
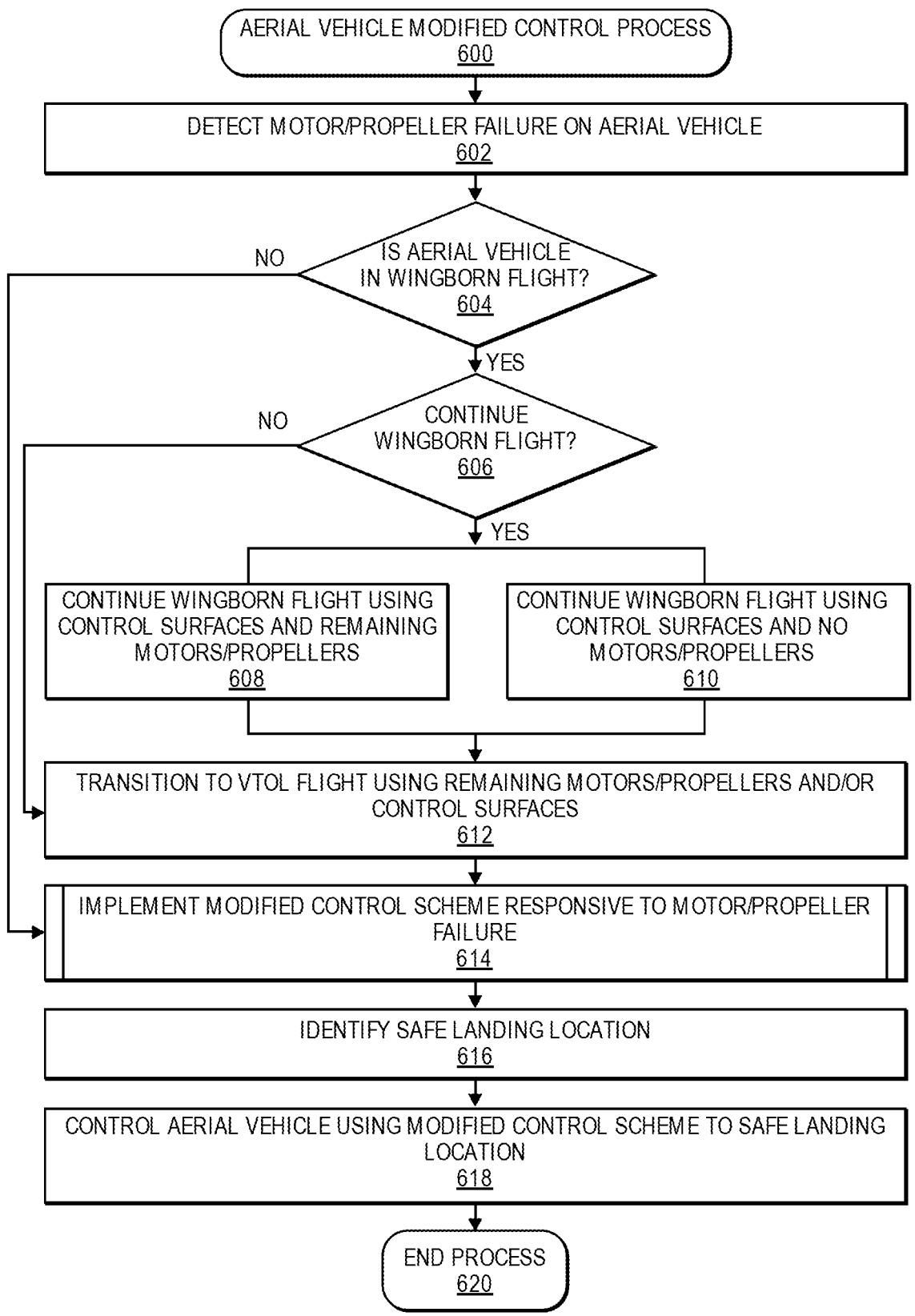
FIG. 6 illustrates a flow diagram of an example aerial vehicle modified control process, in accordance with disclosed implementations.

FIG. 6 illustrates a flow diagram illustrating an example aerial vehicle modified control process 600, in accordance with disclosed implementations.

The process 600 may begin by detecting a motor/propeller failure on an aerial vehicle, as at 602. For example, the motor/propeller failure may be a propulsion mechanism failure. In addition, the detected failure may be any of the various types of faults that may result in motor out situations, as described herein.

The process 600 may continue by determining whether the aerial vehicle is currently in wingborn flight, as at 604. For example, wingborn flight may be synonymous with navigation of the aerial vehicle in a substantially horizontal direction, as described with reference to FIGS. 1 and 3-5. This may be determined based on data associated with the flight controller and/or one or more motor controllers. In addition, this may be determined based on a flight plan of the aerial vehicle. Further, this may be determined based on data associated with one or more sensors, such as an inertial measurement unit, accelerometers, and/or gyroscopes.

If it is determined that the aerial vehicle is currently in wingborn flight, it may then be determined whether the aerial vehicle is to continue wingborn flight, as at 606. This may be determined based on a flight plan of the aerial vehicle, controllability of the aerial vehicle due to the motor out situation, remaining power or range of the aerial vehicle, additional drag due to the motor out situation, distance to a safe landing location for the aerial vehicle, objects, people, and/or obstacles in an environment of the aerial vehicle, temperature, wind, precipitation, pressure, or other environmental factors, and/or various other factors.

If it is determined that the aerial vehicle is to continue wingborn flight, then the process 600 may proceed by continuing wingborn flight of the aerial vehicle using any control surfaces and any remaining propulsion mechanisms, e.g., powered wingborn flight, as at 608, or by continuing wingborn flight of the aerial vehicle using any control surfaces and no remaining propulsion mechanisms, e.g., gliding wingborn flight, as at 610. The determination of whether to continue with powered wingborn flight or gliding wingborn flight may also be based on a flight plan of the aerial vehicle, controllability of the aerial vehicle due to the motor out situation, remaining power or range of the aerial vehicle, additional drag due to the motor out situation, distance to a safe landing location for the aerial vehicle, objects, people, and/or obstacles in an environment of the aerial vehicle, temperature, wind, precipitation, pressure, or other environmental factors, and/or various other factors.

After continuing wingborn flight, as at 608 or 610, or after determining that the aerial vehicle is not to continue wingborn flight, as at 606, the process 600 may continue to transition the aerial vehicle from wingborn flight to VTOL flight using any control surfaces and/or any remaining propulsion mechanisms, as at 612. As described herein, the aerial vehicle may transition from wingborn flight to VTOL flight by reducing pitch and/or speed of the aerial vehicle such that the ring wing produces less lift and the aerial vehicle pitches rearward to a VTOL flight orientation, as described with respect to FIG. 2.

After transitioning to VTOL flight, as at 612, or after determining that the aerial vehicle is not currently in wingborn flight, as at 604, the process 600 may continue by implementing a modified control scheme responsive to the detected motor/propeller failure, as at 614. For example, responsive to the motor out situation, the aerial vehicle may implement one or more modified control schemes, as further described herein. In example embodiments, the modified control scheme may include emulating a quadcopter operation. In other example embodiments, the modified control scheme may include using remaining propulsion mechanisms to control flight and navigation of the aerial vehicle. In further example embodiments, the modified control scheme may include tilting a coordinate frame of the aerial vehicle responsive to the motor out situation.

Then, the process 600 may proceed by identifying a safe landing location, as at 616. For example, the safe landing location may be predetermined and stored by or provided to the aerial vehicle. Various safe landing locations may be identified and stored beforehand, and the aerial vehicle may identify a closest available safe landing location responsive to the motor out situation. In other examples, the aerial vehicle may use one or more sensors, such as imaging devices, radar, LIDAR, proximity sensors, inertial measurement units, navigation sensors such as global positioning sensors, and/or other types of sensors, to identify a safe landing location responsive to the motor out situation. Various other types of sensors, beacons, communication devices, or other sensors may also be used to identify a safe landing location for the aerial vehicle.

The process 600 may then continue to control the aerial vehicle using the modified control scheme to the safe landing location, as at 618. For example, the aerial vehicle may implement the modified control scheme using remaining propulsion mechanisms, and the aerial vehicle may navigate to the identified safe landing location using one or more sensors, such as imaging devices and navigation sensors. The process 600 may then end, as at 620.

Figure 7:
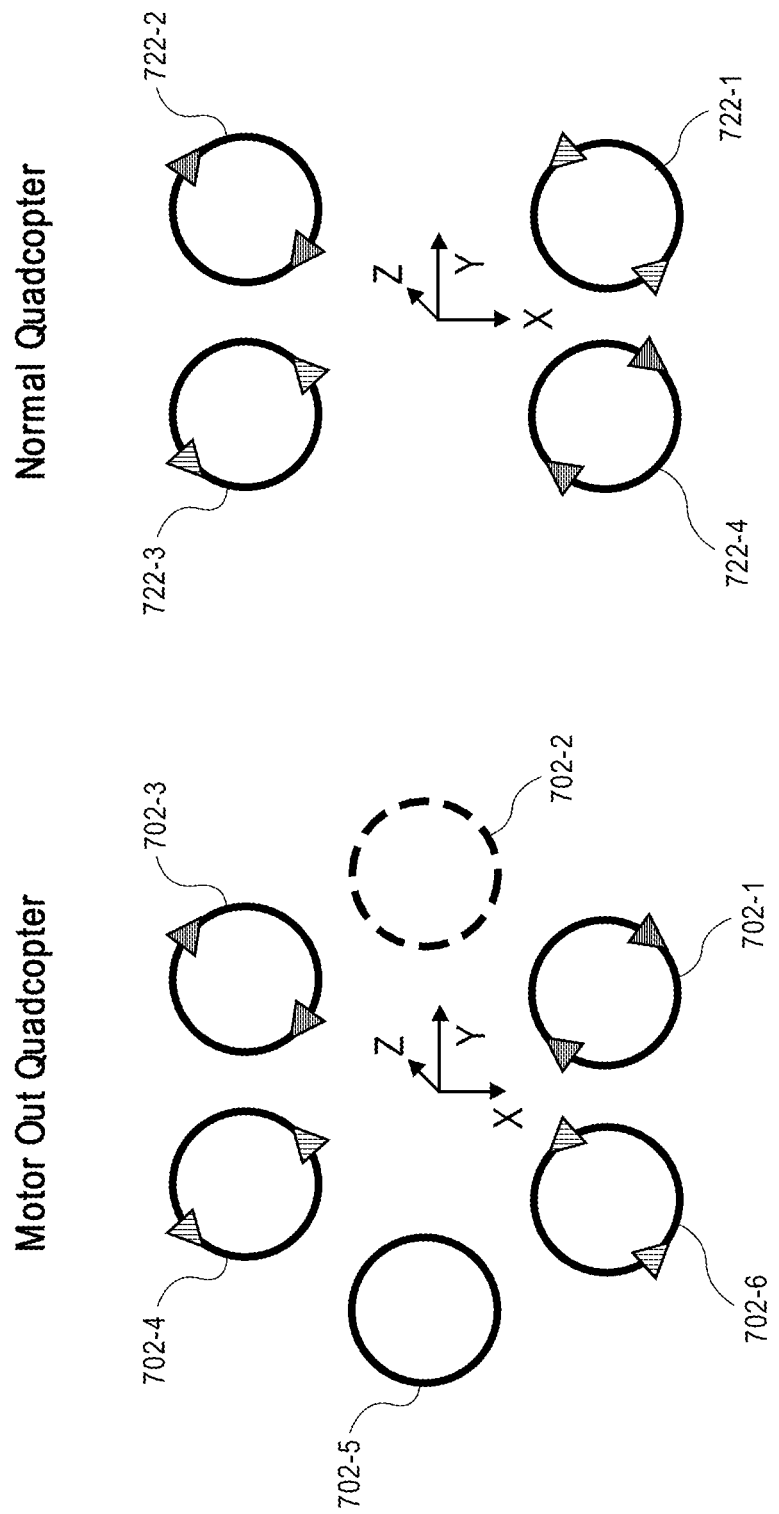
FIG. 7 illustrates schematic diagrams of a modified control scheme to emulate a quadcopter, in accordance with disclosed implementations.

FIG. 7 illustrates schematic diagrams of a modified control scheme to emulate a quadcopter, in accordance with disclosed implementations.

As illustrated, the left side view of FIG. 7 schematically shows an aerial vehicle having a configuration similar to that described with respect to FIGS. 1-5. The example left side view of FIG. 7 may be a top view of the aerial vehicle in a VTOL orientation. The aerial vehicle may include six propulsion mechanisms 702-1, 702-2, 702-3, 702-4, 702-5, and 702-6. One of the propulsion mechanisms, e.g., 702-2, may have failed or experienced one or more faults as described herein, such that the aerial vehicle is in a motor out situation. In addition, responsive to the motor out situation, a propulsion mechanism 702-5 opposite the failed propulsion mechanism 702-2 may be turned off or stopped. As a result, the aerial vehicle may be operating primarily with four propulsion mechanisms 702-1, 702-3, 702-4, and 702-6 responsive to the motor out situation.

As reference, the right side view of FIG. 7 schematically shows a top view of an example quadcopter aerial vehicle in a VTOL orientation. The quadcopter may include four propulsion mechanisms 722-1, 722-2, 722-3, and 722-4. In addition, in normal operation of the quadcopter, the rotational direction of each propulsion mechanism 722 may be the opposite of the rotational directions of each adjacent propulsion mechanism 722. For example, propulsion mechanism 722-1 may rotate in a first direction, propulsion mechanism 722-2 may rotate in a second direction opposite the first direction, propulsion mechanism 722-3 may rotate in the first direction, and propulsion mechanism 722-4 may rotate in the second direction. In this manner, the quadcopter may have good controllability in the various degrees of freedom of movement.

In contrast to the reference quadcopter in the right side view of FIG. 7, the aerial vehicle in the left side view of FIG. 7 that is in the motor out situation may have coupled moments and/or coupled forces due to the rotational directions of the remaining four propulsion mechanisms 702-1, 702-3, 702-4, and 702-6. That is, in normal operation of the aerial vehicle, the rotational directions of the propulsion mechanisms 702-1 and 702-3 that are adjacent each other may be in the same direction, e.g., the second direction, and the rotational directions of the propulsion mechanisms 702-4 and 702-6 that are also adjacent each other may be in the same direction, e.g., the first direction. In order to emulate the normal operation of the quadcopter shown in the right side view of FIG. 7, the rotational directions of two of the propulsion mechanisms, e.g., 702-1 and 702-6, may be reversed. In this manner, the aerial vehicle may more closely emulate the normal operation of the quadcopter and provide better controllability in the various degrees of freedom of movement.

For example, by reversing the rotational directions of two of the propulsion mechanisms in the left side view of FIG. 7, the propellers of the reversed propulsion mechanisms may rotate in a direction that is opposite their intended direction of rotation. Thus, the propellers of the reversed propulsion mechanisms may not generate lift as efficiently as when they are rotated in their intended directions of rotation, or may generate lift in a downward direction, dependent on the geometry and configuration of the propellers. In some examples, to compensate for this, the reversed propulsion mechanisms may be commanded to rotate at a higher rpm or otherwise operated to generate greater lift. In other examples, the pitches of one or more blades of the propellers may be rotated, e.g., approximately 180 degrees, or between approximately 120 degrees and approximately 240 degrees depending on the direction of rotation of the blade pitches, such that the propellers rotate in the intended direction of rotation and generate lift when the rotational directions of the propulsion mechanisms, e.g., motors, are reversed. Further, the blades of the propellers may be designed or configured to provide lift when rotated in a reverse rotational direction and with a pitch rotation of approximately 180 degrees, or between approximately 120 degrees and approximately 240 degrees depending on the direction of rotation of the blade pitches.

Figure 8:
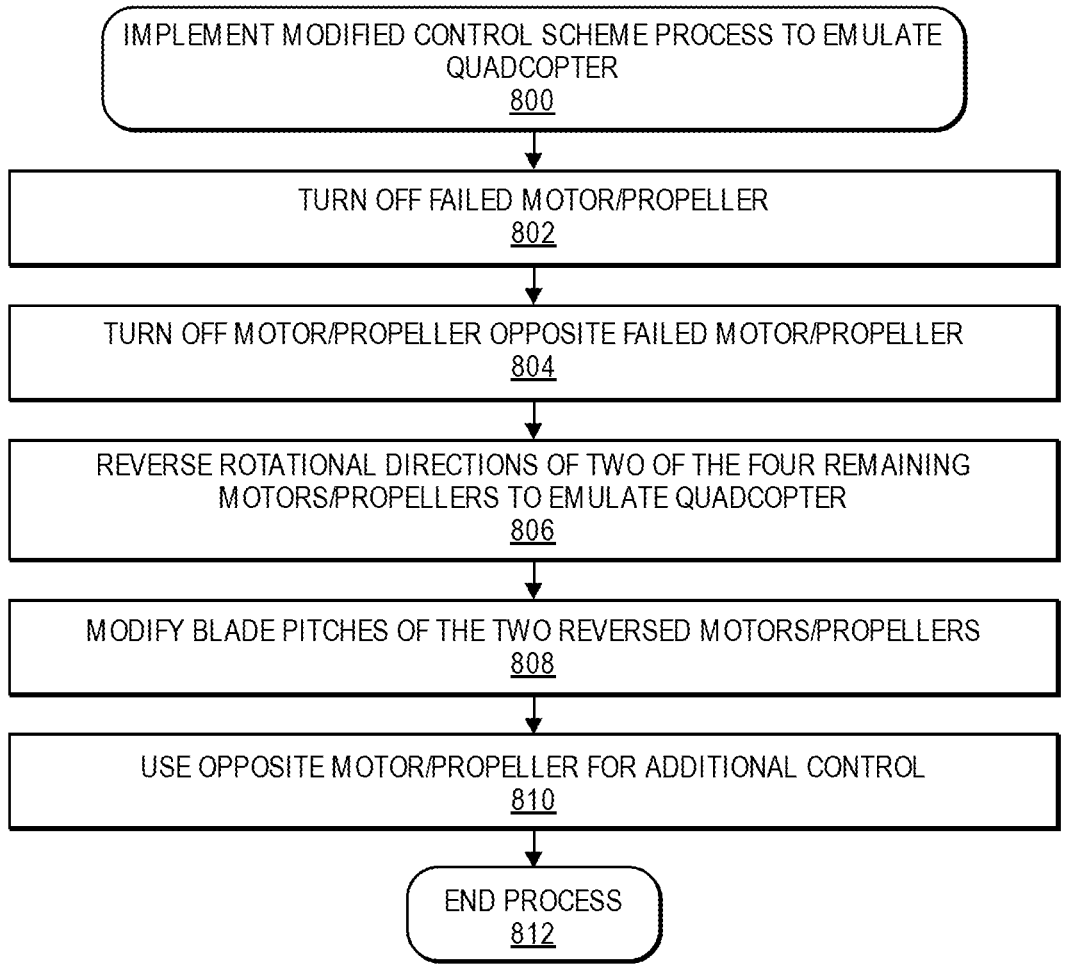
FIG. 8 illustrates a flow diagram of an example implement modified control scheme process to emulate quadcopter, in accordance with disclosed implementations.

FIG. 8 illustrates a flow diagram illustrating an example implement modified control scheme process to emulate quadcopter 800, in accordance with disclosed implementations.

The process 800 may begin by turning off the failed motor/propeller, as at 802. For example, the motor/propeller failure may be a propulsion mechanism failure. In addition, the detected failure may be any of the various types of faults that may result in motor out situations, as described herein. In order to turn off or stop the failed propulsion mechanism, a brake associated with the propulsion mechanism may be actuated, current or voltage applied to the propulsion mechanism may be terminated, electrical connection between the propulsion mechanism and a power source may be interrupted or terminated, a motor controller may instruct the propulsion mechanism to stop, a flight controller may instruct a motor controller to stop the propulsion mechanism, or other actions may be taken to turn off or stop the failed propulsion mechanism.

The process 800 may continue by turning off the motor/propeller opposite the failed motor/propeller, as at 804. For example, the opposite motor/propeller may be a propulsion mechanism. In order to turn off or stop the opposite propulsion mechanism, a brake associated with the propulsion mechanism may be actuated, current or voltage applied to the propulsion mechanism may be terminated, electrical connection between the propulsion mechanism and a power source may be interrupted or terminated, a motor controller may instruct the propulsion mechanism to stop, a flight controller may instruct a motor controller to stop the propulsion mechanism, or other actions may be taken to turn off or stop the opposite propulsion mechanism.

The process 800 may then proceed to reverse rotational directions of two of the remaining four motors/propellers to emulate a quadcopter, as at 806. For example, as described with respect to FIG. 7, two of the remaining four propulsion mechanisms may be rotated in a reverse direction such that each propulsion mechanism rotates in a direction that is opposite to the rotational directions of adjacent propulsion mechanisms. In addition, blade pitches of reversed motors/propellers may also be modified, as at 808. For example, blade pitches may be rotated approximately 180 degrees, or between approximately 120 degrees and approximately 240 degrees depending on the direction of rotation of the blade pitches, in order to provide desired lift to the aerial vehicle by the reversed propulsion mechanisms, if the propeller blades are designed or configured to provide lift in such an orientation.

Further, the process 800 may also include using the opposite motor/propeller for additional control, as at 810. For example, although the aerial vehicle is now being controlled substantially to emulate normal operation of a quadcopter, the opposite or fifth propulsion mechanism may still be used to provide additional control in one or more of the degrees of freedom of movement as desired, assuming the fifth propulsion mechanism is still operational.

By this example process 800, an aerial vehicle that is in a motor out situation may modify its control scheme to emulate normal operation of a quadcopter and may continue flight or navigation for some time, and/or for only as long as necessary to reach a safe landing location. The process 800 may then end, as at 812.

Figure 9:
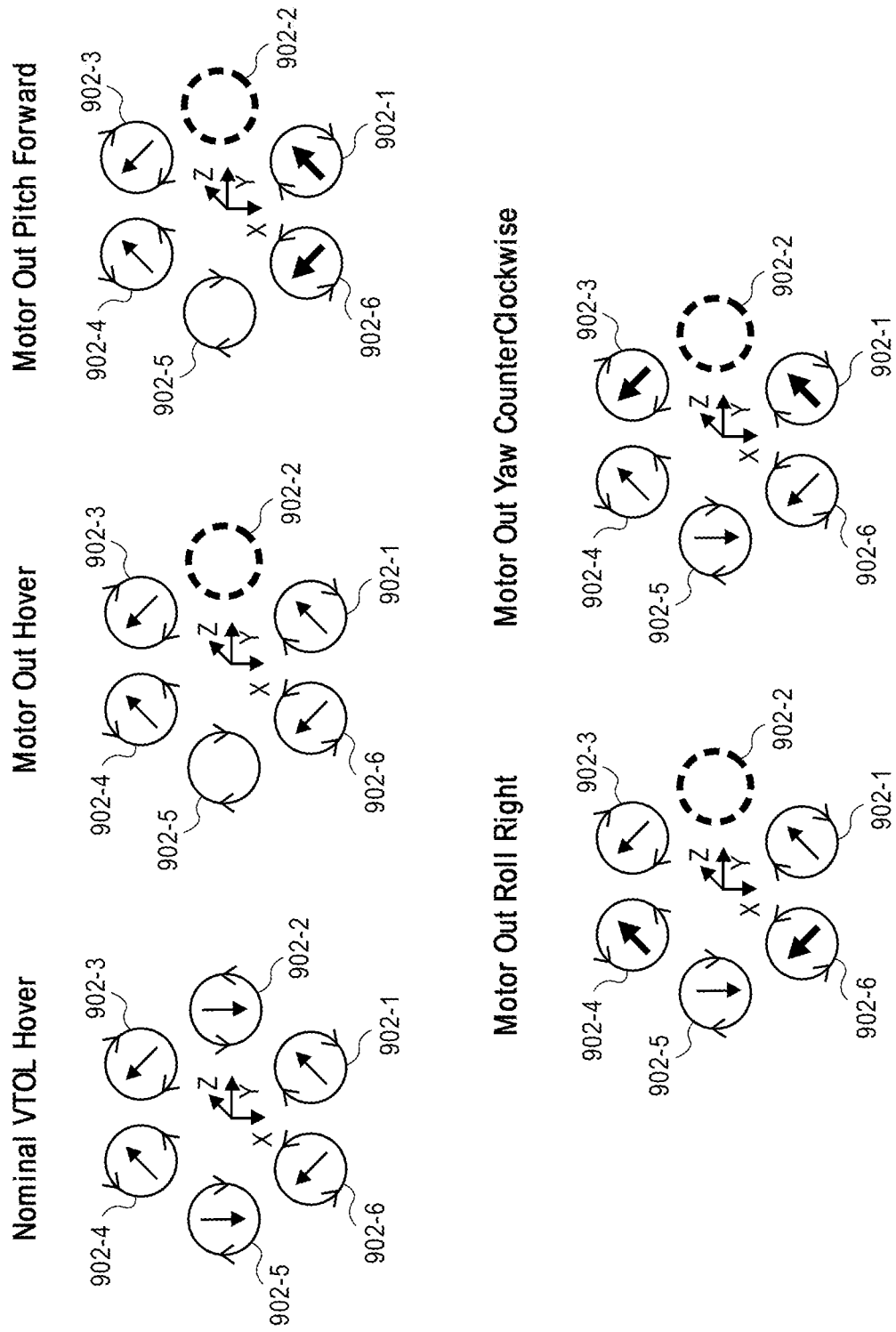
FIG. 9 illustrates schematic diagrams of a modified control scheme using remaining propulsion mechanisms, in accordance with disclosed implementations.

FIG. 9 illustrates schematic diagrams of a modified control scheme using remaining propulsion mechanisms, in accordance with disclosed implementations.

As illustrated, the upper left side view of FIG. 9 schematically shows an aerial vehicle having a configuration similar to that described with respect to FIGS. 1-5. The example upper left side view of FIG. 9 may be a top view of the aerial vehicle in a VTOL orientation. The aerial vehicle may include six propulsion mechanisms 902-1, 902-2, 902-3, 902-4, 902-5, and 902-6. The example upper left side view of FIG. 9 may illustrate a nominal VTOL hover configuration in which all six propulsion mechanisms 902 are fully operational.

As illustrated, all six propulsion mechanisms 902 may provide thrust or lift to the aerial vehicle that includes at least a component that points directly out of the page of FIG. 9, along the positive Z direction. The arrows within each propulsion mechanism 902 also indicate an additional direction of thrust that results from the cant or angle of each propulsion mechanism relative to a horizontal plane that extends substantially through all six propulsion mechanisms. For example, propulsion mechanisms 902-2 and 902-5 may provide additional thrust to the aerial vehicle along the positive X direction. In addition, propulsion mechanisms 902-1 and 902-4 may provide additional thrust to the aerial vehicle along the negative X direction and the positive Y direction. Further, propulsion mechanisms 902-3 and 902-6 may provide additional thrust to the aerial vehicle along the negative X direction and the negative Y direction. As shown, each of the six propulsion mechanisms may be canted at a same angle in different directions, e.g., 30 degrees relative to a horizontal plane that extends substantially through all six propulsion mechanisms. In other example embodiments, the six propulsion mechanisms may be canted at different angles or in different directions, and/or one or more of the propulsion mechanisms may be canted at different angles or in different directions from one or more other propulsion mechanisms.

As illustrated, the remaining views of FIG. 9 schematically show an aerial vehicle in which one of the propulsion mechanisms, e.g., 902-2, may have failed or experienced one or more faults as described herein, such that the aerial vehicle is in a motor out situation. As a result, the aerial vehicle may be operating primarily with five propulsion mechanisms 902-1, 902-3, 902-4, 902-5, and 902-6 responsive to the motor out situation.

For example, the upper middle view of FIG. 9 may also be a top view of the aerial vehicle in a VTOL orientation, and the example upper middle view of FIG. 9 may illustrate a motor out hover configuration in which five propulsion mechanisms 902 are operational. In the motor out hover configuration, the propulsion mechanism 902-5 opposite the failed propulsion mechanism 902-2 may also be turned off or stopped. As shown, the remaining four propulsion mechanisms 902-1, 902-3, 902-4, and 902-6 may each provide approximately equal thrust or lift to the aerial vehicle, such that the aerial vehicle may hover using only these four propulsion mechanisms. However, due to the cant of the remaining four propulsion mechanisms, the aerial vehicle may experience a creep or drift in the negative X direction because all four propulsion mechanisms provide additional thrust in the negative X direction. In some examples, to compensate for the drift in the negative X direction, the aerial vehicle may utilize the fifth propulsion mechanism 902-5 to counteract the drift. In other examples, to compensate for the drift in the negative X direction, the aerial vehicle may be modified to a tilted coordinate frame as further described herein with respect to FIG. 10.

In addition, the upper right side view of FIG. 9 may also be a top view of the aerial vehicle in a VTOL orientation, and the example upper right side view of FIG. 9 may illustrate a motor out pitch forward configuration in which five propulsion mechanisms 902 are operational. In the motor out pitch forward configuration, the propulsion mechanism 902-5 opposite the failed propulsion mechanism 902-2 may also be turned off or stopped. As shown, the two rear propulsion mechanisms 902-1 and 902-6 may together provide approximately greater thrust or lift to the aerial vehicle than the two front propulsion mechanisms 902-3 and 902-4 together, such that the aerial vehicle may pitch forward using only these four propulsion mechanisms. In contrast, for a motor out pitch rearward configuration, the two front propulsion mechanisms 902-3 and 902-4 may together provide approximately greater thrust or lift to the aerial vehicle than the two rear propulsion mechanisms 902-1 and 902-6 together, such that the aerial vehicle may pitch rearward using only these four propulsion mechanisms. However, due to the cant of the remaining four propulsion mechanisms, the aerial vehicle may experience a creep or drift in the negative X direction because all four propulsion mechanisms provide additional thrust in the negative X direction. In some examples, to compensate for the drift in the negative X direction, the aerial vehicle may utilize the fifth propulsion mechanism 902-5 to counteract the drift. In other examples, to compensate for the drift in the negative X direction, the aerial vehicle may be modified to a tilted coordinate frame as further described herein with respect to FIG. 10.

Further, the lower left side view of FIG. 9 may also be a top view of the aerial vehicle in a VTOL orientation, and the example lower left side view of FIG. 9 may illustrate a motor out roll right configuration in which five propulsion mechanisms 902 are operational. In the motor out roll right configuration, the propulsion mechanism 902-5 opposite the failed propulsion mechanism 902-2 may also be turned off or stopped. As shown, the two left propulsion mechanisms 902-4 and 902-6 may together provide approximately greater thrust or lift to the aerial vehicle than the two right propulsion mechanisms 902-1 and 902-3 together, such that the aerial vehicle may roll right using only these four propulsion mechanisms. In contrast, for a motor out roll left configuration, the two right propulsion mechanisms 902-1 and 902-3 may together provide approximately greater thrust or lift to the aerial vehicle than the two left propulsion mechanisms 902-4 and 902-6 together, such that the aerial vehicle may roll left using only these four propulsion mechanisms.

However, due to the cant of the remaining four propulsion mechanisms, roll of the aerial vehicle may be coupled with yaw of the aerial vehicle in motor out situations. In some examples, to compensate for the coupled yaw of the aerial vehicle when instructing roll of the aerial vehicle, the aerial vehicle may utilize the fifth propulsion mechanism 902-5 to counteract the coupled yaw. For example, when rolling right, the aerial vehicle may also experience a coupled clockwise yaw, and the fifth propulsion mechanism 902-5 may provide thrust to counteract the coupled yaw, e.g., thrust in a counterclockwise direction by rotating the fifth propulsion mechanism 902-5 in a normal direction. Likewise, when rolling left, the aerial vehicle may also experience a coupled counterclockwise yaw, and the fifth propulsion mechanism 902-5 may provide thrust to counteract the coupled yaw, e.g., thrust in a clockwise direction by rotating the fifth propulsion mechanism 902-5 in a reverse direction.

Further, due to the cant of the remaining four propulsion mechanisms, the aerial vehicle may experience a creep or drift in the negative X direction because all four propulsion mechanisms provide additional thrust in the negative X direction. In some examples, to compensate for the drift in the negative X direction, the aerial vehicle may utilize the fifth propulsion mechanism 902-5 to counteract the drift. In other examples, to compensate for the drift in the negative X direction, the aerial vehicle may be modified to a tilted coordinate frame as further described herein with respect to FIG. 10.

Moreover, the lower right side view of FIG. 9 may also be a top view of the aerial vehicle in a VTOL orientation, and the example lower right side view of FIG. 9 may illustrate a motor out yaw counterclockwise configuration in which five propulsion mechanisms 902 are operational. In the motor out yaw counterclockwise configuration, the propulsion mechanism 902-5 opposite the failed propulsion mechanism 902-2 may also be turned off or stopped. As shown, the two right propulsion mechanisms 902-1 and 902-3 may together provide approximately greater thrust or lift to the aerial vehicle than the two left propulsion mechanisms 902-4 and 902-6 together, such that the aerial vehicle may yaw counterclockwise using only these four propulsion mechanisms. In contrast, for a motor out yaw clockwise configuration, the two left propulsion mechanisms 902-4 and 902-6 may together provide approximately greater thrust or lift to the aerial vehicle than the two right propulsion mechanisms 902-1 and 902-3 together, such that the aerial vehicle may yaw clockwise using only these four propulsion mechanisms.

However, due to the cant of the remaining four propulsion mechanisms, yaw of the aerial vehicle may be coupled with roll of the aerial vehicle in motor out situations. In some examples, to compensate for the coupled roll of the aerial vehicle when instructing yaw of the aerial vehicle, the aerial vehicle may utilize the fifth propulsion mechanism 902-5 to counteract the coupled roll. For example, when yawing clockwise, the aerial vehicle may also experience a coupled roll right, and the fifth propulsion mechanism 902-5 may provide thrust to counteract the coupled roll, e.g., thrust in a rolling left direction by rotating the fifth propulsion mechanism 902-5 in a reverse direction. Likewise, when yawing counterclockwise, the aerial vehicle may also experience a coupled roll left, and the fifth propulsion mechanism 902-5 may provide thrust to counteract the coupled roll, e.g., thrust in a rolling right direction by rotating the fifth propulsion mechanism 902-5 in a normal direction.

Further, due to the cant of the remaining four propulsion mechanisms, the aerial vehicle may experience a creep or drift in the negative X direction because all four propulsion mechanisms provide additional thrust in the negative X direction. In some examples, to compensate for the drift in the negative X direction, the aerial vehicle may utilize the fifth propulsion mechanism 902-5 to counteract the drift. In other examples, to compensate for the drift in the negative X direction, the aerial vehicle may be modified to a tilted coordinate frame as further described herein with respect to FIG. 10.

Figure 10:
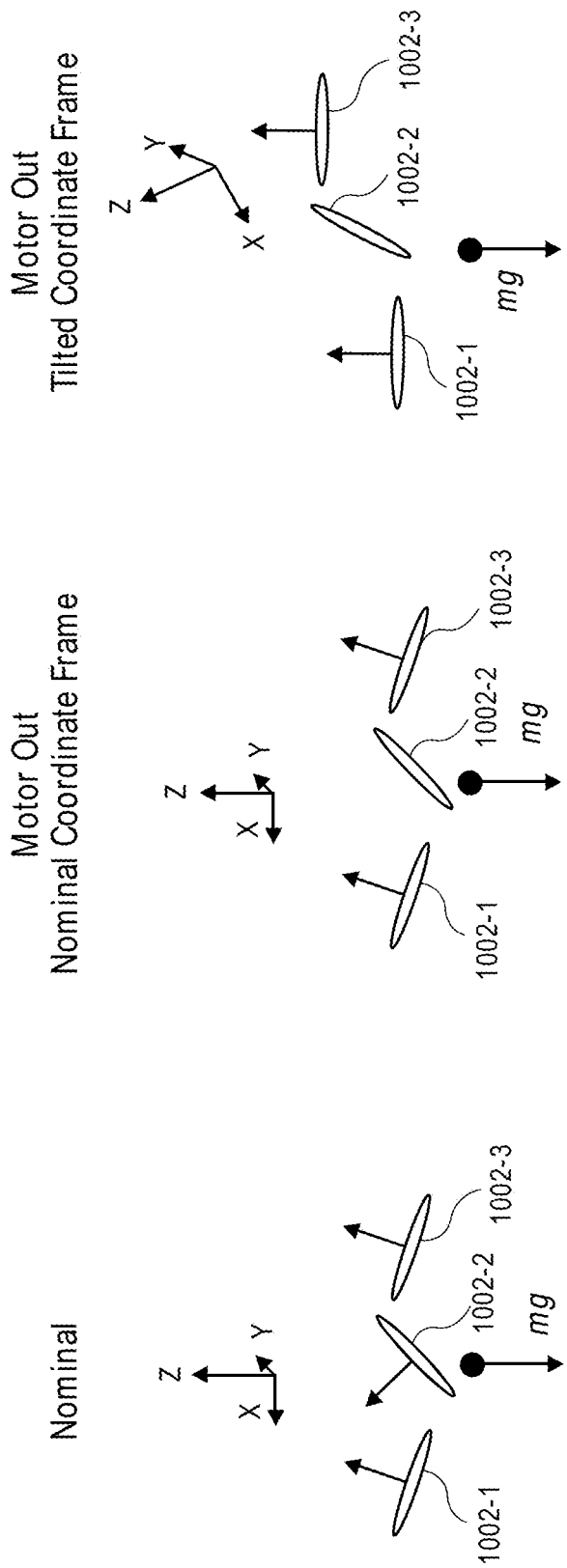
FIG. 10 illustrates schematic diagrams of a modified control scheme using a tilted coordinate frame, in accordance with disclosed implementations.

FIG. 10 illustrates schematic diagrams of a modified control scheme using a tilted coordinate frame, in accordance with disclosed implementations.

As illustrated, the left side view of FIG. 10 schematically shows an aerial vehicle having a configuration similar to that described with respect to FIGS. 1-5. The example left side view of FIG. 10 may be a side view of the aerial vehicle in a VTOL orientation. The aerial vehicle may include six propulsion mechanisms, of which only three propulsion mechanisms 1002-1, 1002-2, and 1002-3 are illustrated in the left side view of FIG. 10 (the remaining three propulsion mechanisms being positioned directly behind the illustrated three propulsion mechanisms and into the page of FIG. 10). The example left side view of FIG. 10 may illustrate a nominal VTOL hover configuration in which all six propulsion mechanisms 1002 are operational.

In addition, the middle and right side views of FIG. 10 schematically show an aerial vehicle in which one of the propulsion mechanisms, e.g., 1002-2, may have failed or experienced one or more faults as described herein, such that the aerial vehicle is in a motor out situation. As a result, the aerial vehicle may be operating primarily with five propulsion mechanisms 1002 responsive to the motor out situation.

As illustrated in the middle view of FIG. 10, because the propulsion mechanism 1002-2 may have failed or experienced a fault, no thrust or lift is generated by the propulsion mechanism 1002-2. In addition, the opposite propulsion mechanism (situated directly behind and into the page from propulsion mechanism 1002-2) may be turned off or stopped. As a result, each of the remaining four propulsion mechanisms, e.g., 1002-1, 1002-3, and two propulsion mechanisms directly behind and into the page from 1002-1 and 1002-3, may each provide thrust that includes a component in the negative X direction, thereby causing the creep or drift of the aerial vehicle in the negative X direction, as described herein with respect to FIG. 9.

Therefore, as illustrated in the right side view of FIG. 10, in order to compensate for the drift in the negative X direction, the coordinate frame of the aerial vehicle may be tilted to a tilted coordinate frame, such that each of the remaining four propulsion mechanisms, e.g., 1002-1, 1002-3, and two propulsion mechanisms directly behind and into the page from 1002-1 and 1002-3, may each provide thrust that does not include a component in the negative X direction. In example embodiments, in order to tilt the coordinate frame of the aerial vehicle, a rotation matrix may be applied to a reference coordinate frame of the flight controller of the aerial vehicle, such that outputs from each of the motor controllers and/or propulsion mechanisms is modified to correspond to the tilted coordinate frame.

Further, because the propulsion mechanism 1002-1 and the adjacent propulsion mechanism directly behind and into the page from 1002-1 may be angled toward or away from each other by the same angle, any thrust generated in the positive or negative Y direction by propulsion mechanism 1002-1 may be substantially canceled by thrust generated in the corresponding negative or positive Y direction by the adjacent propulsion mechanism. Likewise, because the propulsion mechanism 1002-3 and the adjacent propulsion mechanism directly behind and into the page from 1002-3 may be angled toward or away from each other by the same angle, any thrust generated in the positive or negative Y direction by propulsion mechanism 1002-3 may be substantially canceled by thrust generated in the corresponding negative or positive Y direction by the adjacent propulsion mechanism. In this manner, the aerial vehicle having a tilted coordinate frame as illustrated in the right side view of FIG. 10 may generate a net thrust or lift in substantially only the positive Z direction when all remaining four propulsion mechanisms generate approximately equal thrust.

Figure 11A:
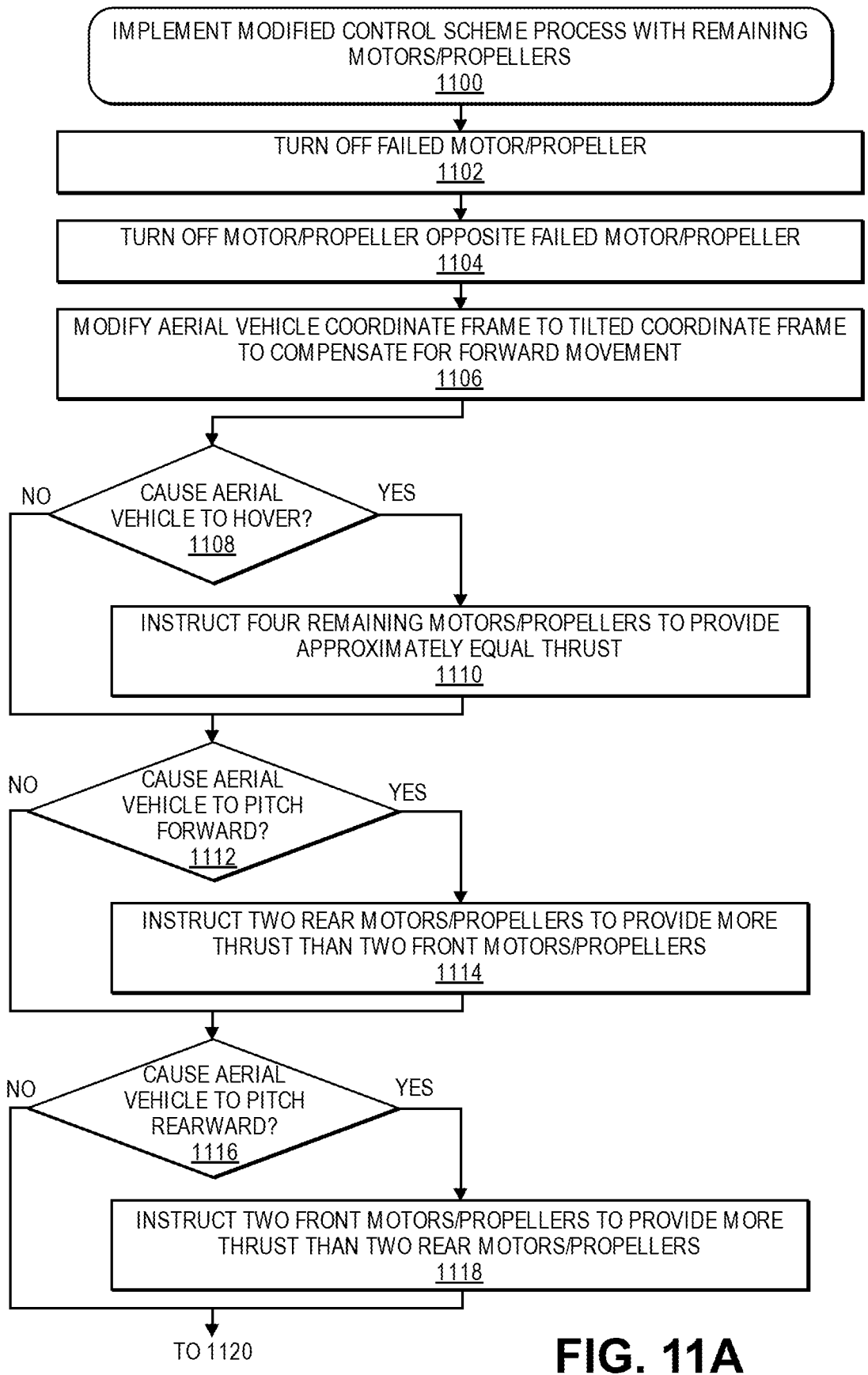
FIGS. 11A-11C illustrate a flow diagram of an example implement modified control scheme process using remaining propulsion mechanisms, in accordance with disclosed implementations.
Figure 11B:
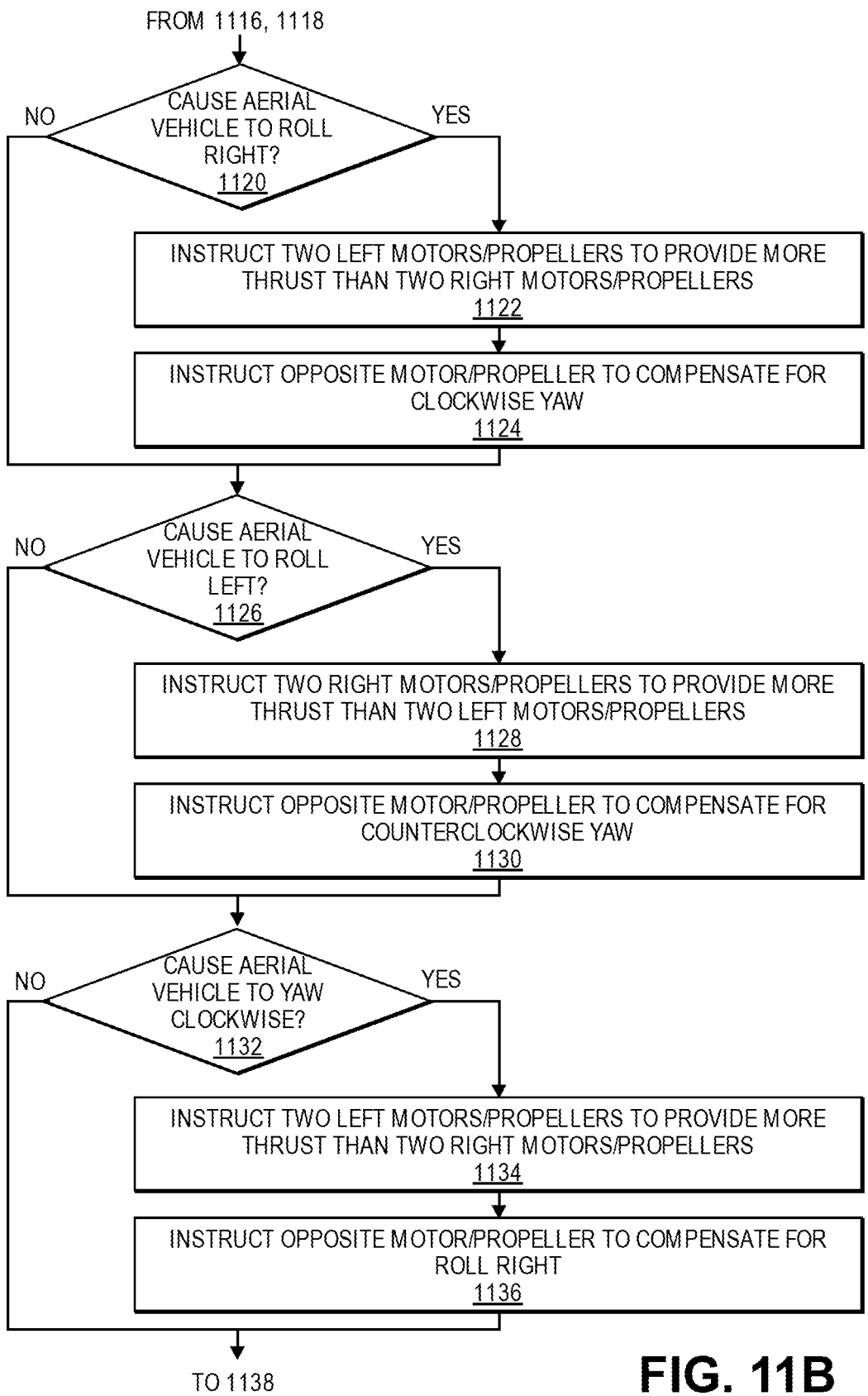
Figure 11C:
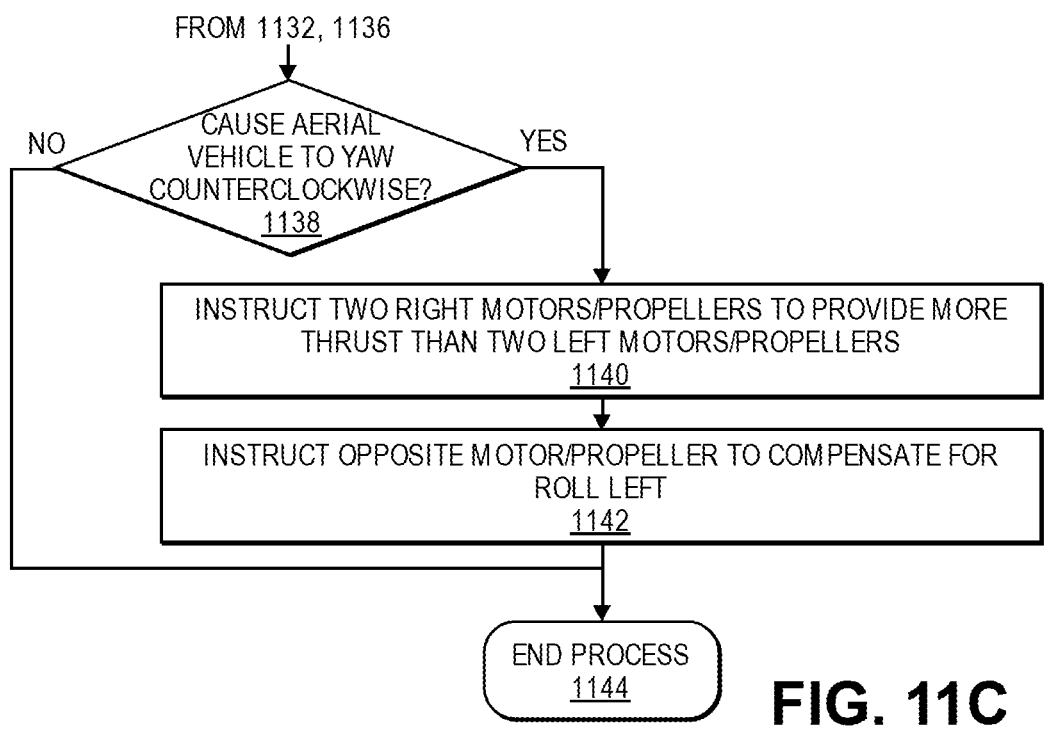

FIGS. 11A-11C illustrate a flow diagram illustrating an example implement modified control scheme process using remaining propulsion mechanisms 1100, in accordance with disclosed implementations.

The process 1100 may begin by turning off the failed motor/propeller, as at 1102. For example, the motor/propeller failure may be a propulsion mechanism failure. In addition, the detected failure may be any of the various types of faults that may result in motor out situations, as described herein. In order to turn off or stop the failed propulsion mechanism, a brake associated with the propulsion mechanism may be actuated, current or voltage applied to the propulsion mechanism may be terminated, electrical connection between the propulsion mechanism and a power source may be interrupted or terminated, a motor controller may instruct the propulsion mechanism to stop, a flight controller may instruct a motor controller to stop the propulsion mechanism, or other actions may be taken to turn off or stop the failed propulsion mechanism.

The process 1100 may continue by turning off the motor/propeller opposite the failed motor/propeller, as at 1104. For example, the opposite motor/propeller may be a propulsion mechanism. In order to turn off or stop the opposite propulsion mechanism, a brake associated with the propulsion mechanism may be actuated, current or voltage applied to the propulsion mechanism may be terminated, electrical connection between the propulsion mechanism and a power source may be interrupted or terminated, a motor controller may instruct the propulsion mechanism to stop, a flight controller may instruct a motor controller to stop the propulsion mechanism, or other actions may be taken to turn off or stop the opposite propulsion mechanism.

The process 1100 may then proceed to modify the aerial vehicle coordinate frame to the tilted coordinate frame to compensate for forward movement, as at 1106. For example, as described with respect to FIG. 10, the flight controller and/or motor controllers may provide commands or instructions such that the coordinate frame of the aerial vehicle is tilted responsive to the motor out situation, and/or a rotation matrix may be applied to a reference frame of the flight controller, the motor controllers, and/or the propulsion mechanisms. In example embodiments, one or more sensors, such as an inertial measurement unit, accelerometers, gyroscopes, or other sensors, may provide data to the flight controller and/or motor controllers such that the aerial vehicle may modify its operation to the tilted coordinate frame. In other example embodiments, this step 1106 may be optional or skipped, and the aerial vehicle may be controlled according to the modified control scheme without tilting the coordinate frame of the aerial vehicle.

The process 1100 may then continue to determine whether one or more movements are desired, instructed, or commanded for the aerial vehicle using the remaining five propulsion mechanisms, e.g., all propulsion mechanisms except the failed propulsion mechanism. Further, although the various movements, e.g., hover, pitch, roll, and yaw, of the aerial vehicle are described herein individually, various instructions or commands of the modified control scheme may comprise combinations of two or more of the various movements, e.g., pitch forward and roll right, or other combinations.

For example, if it is determined that the aerial vehicle should be caused to hover, as at 1108, then the four propulsion mechanisms (with the exception of the fifth, opposite propulsion mechanism) may be instructed to provide approximately equal thrust or lift, as at 1110. In example embodiments, the flight controller and/or motor controllers may provide commands or instructions such that the aerial vehicle may operate in the motor out hover configuration, as described herein with respect to the upper middle view of FIG. 9.

In addition, if it is determined that the aerial vehicle should be caused to pitch forward, as at 1112, then the two rear propulsion mechanisms may be instructed to provide approximately greater thrust or lift than the two front propulsion mechanisms, as at 1114. In example embodiments, the flight controller and/or motor controllers may provide commands or instructions such that the aerial vehicle may operate in the motor out pitch forward configuration, as described herein with respect to the upper right side view of FIG. 9.

Likewise, if it is determined that the aerial vehicle should be caused to pitch rearward, as at 1116, then the two front propulsion mechanisms may be instructed to provide approximately greater thrust or lift than the two rear propulsion mechanisms, as at 1118. In example embodiments, the flight controller and/or motor controllers may provide commands or instructions such that the aerial vehicle may operate in the motor out pitch rearward configuration, as described herein with respect to the upper right side view of FIG. 9.

Further, if it is determined that the aerial vehicle should be caused to roll right, as at 1120, then the two left propulsion mechanisms may be instructed to provide approximately greater thrust or lift than the two right propulsion mechanisms, as at 1122. In example embodiments, the flight controller and/or motor controllers may provide commands or instructions such that the aerial vehicle may operate in the motor out roll right configuration, as described herein with respect to the lower left side view of FIG. 9. In addition, the fifth, opposite propulsion mechanism may be instructed to compensate for coupled clockwise yaw, as at 1124. For example, the fifth, opposite propulsion mechanism may rotate in a normal direction, such that the fifth, opposite propulsion mechanism produces thrust to counteract the coupled clockwise yaw.

Likewise, if it is determined that the aerial vehicle should be caused to roll left, as at 1126, then the two right propulsion mechanisms may be instructed to provide approximately greater thrust or lift than the two left propulsion mechanisms, as at 1128. In example embodiments, the flight controller and/or motor controllers may provide commands or instructions such that the aerial vehicle may operate in the motor out roll left configuration, as described herein with respect to the lower left side view of FIG. 9. In addition, the fifth, opposite propulsion mechanism may be instructed to compensate for coupled counterclockwise yaw, as at 1130. For example, the fifth, opposite propulsion mechanism may rotate in a reverse direction, and/or blade pitches of the propeller may be rotated, such that the fifth, opposite propulsion mechanism produces thrust to counteract the coupled counterclockwise yaw.

Moreover, if it is determined that the aerial vehicle should be caused to yaw clockwise, as at 1132, then the two left propulsion mechanisms may be instructed to provide approximately greater thrust or lift than the two right propulsion mechanisms, as at 1134. In example embodiments, the flight controller and/or motor controllers may provide commands or instructions such that the aerial vehicle may operate in the motor out yaw clockwise configuration, as described herein with respect to the lower right side view of FIG. 9. In addition, the fifth, opposite propulsion mechanism may be instructed to compensate for coupled roll right, as at 1136. For example, the fifth, opposite propulsion mechanism may rotate in a reverse direction, such that the fifth, opposite propulsion mechanism produces thrust to counteract the coupled roll right.

Likewise, if it is determined that the aerial vehicle should be caused to yaw counterclockwise, as at 1138, then the two right propulsion mechanisms may be instructed to provide approximately greater thrust or lift than the two left propulsion mechanisms, as at 1140. In example embodiments, the flight controller and/or motor controllers may provide commands or instructions such that the aerial vehicle may operate in the motor out yaw counterclockwise configuration, as described herein with respect to the lower right side view of FIG. 9. In addition, the fifth, opposite propulsion mechanism may be instructed to compensate for coupled roll left, as at 1142. For example, the fifth, opposite propulsion mechanism may rotate in a normal direction, and/or blade pitches of the propeller may be rotated, such that the fifth, opposite propulsion mechanism produces thrust to counteract the coupled roll left.

By this example process 1100, an aerial vehicle that is in a motor out situation may modify its control scheme to use any and all remaining propulsion mechanisms and may continue flight or navigation for some time, and/or for only as long as necessary to reach a safe landing location. The process 1100 may then end, as at 1144.

Figure 12:
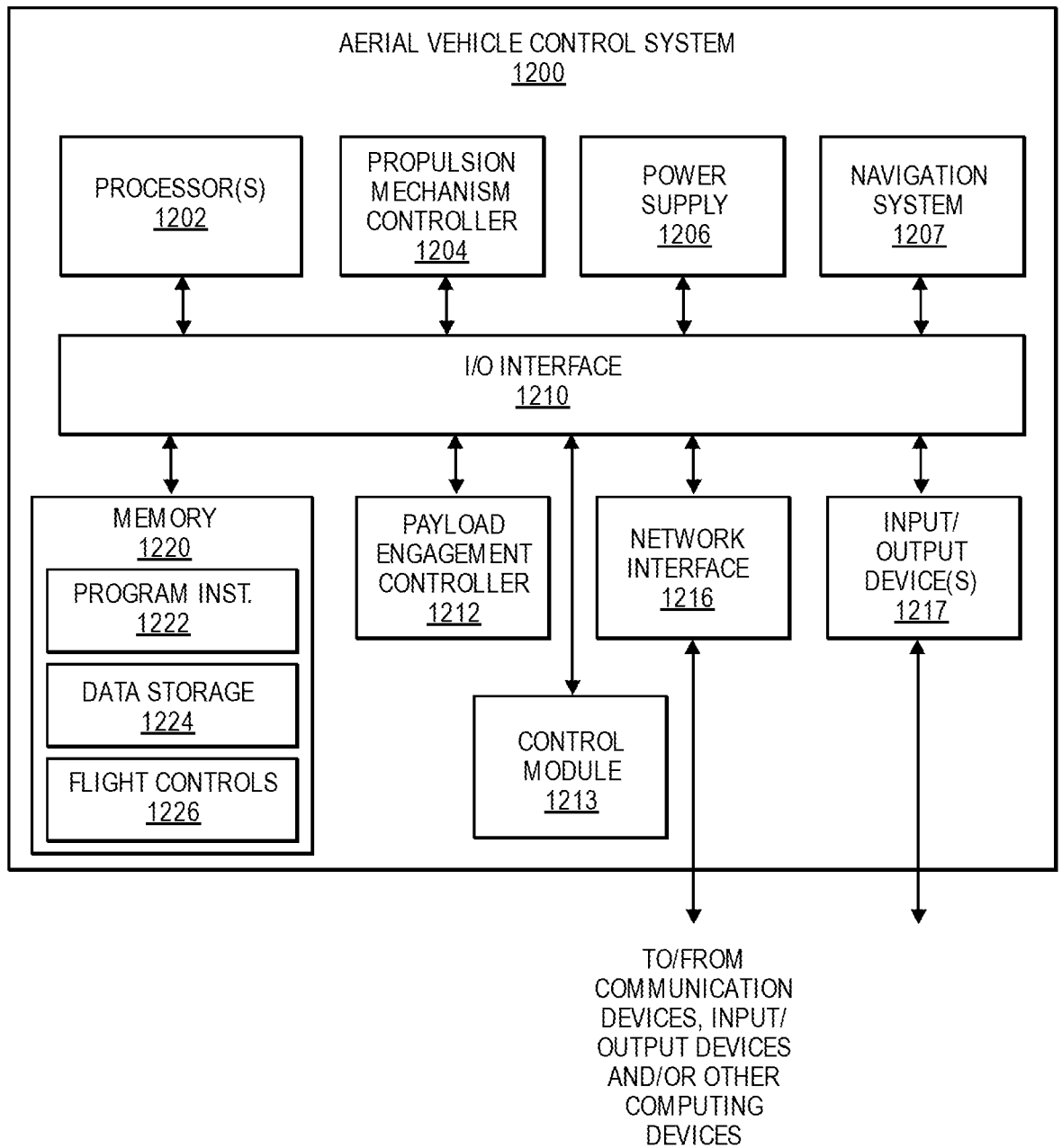
FIG. 12 is a block diagram illustrating various components of an example aerial vehicle control system, in accordance with disclosed implementations.

FIG. 12 is a block diagram illustrating various components of an example aerial vehicle control system 1200, in accordance with disclosed implementations.

In various examples, the block diagram may be illustrative of one or more aspects of the aerial vehicle control system 1200 that may be used to implement the various systems and methods discussed herein and/or to control operation of an aerial vehicle discussed herein. In the illustrated implementation, the aerial vehicle control system 1200 includes one or more processors 1202, coupled to a memory, e.g., a non-transitory computer readable storage medium 1220, via an input/output (I/O) interface 1210. The aerial vehicle control system 1200 also includes propulsion mechanism controllers 1204, such as electronic speed controls (ESCs) or motor controllers, power modules 1206 and/or a navigation system 1207. The aerial vehicle control system 1200 further includes a payload engagement controller 1212, a control module 1213 configured to implement one or more modified control schemes described herein, a network interface 1216, and one or more input/output devices 1217.

In various implementations, the aerial vehicle control system 1200 may be a uniprocessor system including one processor 1202, or a multiprocessor system including several processors 1202 (e.g., two, four, eight, or another suitable number). The processor(s) 1202 may be any suitable processor capable of executing instructions. For example, in various implementations, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 may commonly, but not necessarily, implement the same ISA.

The non-transitory computer readable storage medium 1220 may be configured to store executable instructions, data, flight paths, flight control parameters, center of gravity information, and/or data items accessible by the processor(s) 1202. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1220 as program instructions 1222, data storage 1224 and flight controls 1226, respectively. In other implementations, program instructions, data, and/or flight controls may be received, sent, or stored upon different types of computer-accessible media, such as non-transitory media, or on similar media separate from the non-transitory computer readable storage medium 1220 or the aerial vehicle control system 1200. Generally speaking, a non-transitory, computer readable storage medium may include storage media or memory media such as magnetic or optical media, e.g., disk or CD/DVD-ROM, coupled to the aerial vehicle control system 1200 via the I/O interface 1210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1216.

In one implementation, the I/O interface 1210 may be configured to coordinate I/O traffic between the processor(s) 1202, the non-transitory computer readable storage medium 1220, and any peripheral devices, the network interface or other peripheral interfaces, such as input/output devices 1217. In some implementations, the I/O interface 1210 may perform any necessary protocol, timing or other data transformations to convert data signals from one component (e.g., non-transitory computer readable storage medium 1220) into a format suitable for use by another component (e.g., processor(s) 1202). In some implementations, the I/O interface 1210 may include support for devices attached through various types of peripheral buses, such as a variant of the Peripheral Component Interconnect (PCI) bus standard or the Universal Serial Bus (USB) standard, for example. In some implementations, the function of the I/O interface 1210 may be split into two or more separate components, such as a north bridge and a south bridge, for example. Also, in some implementations, some or all of the functionality of the I/O interface 1210, such as an interface to the non-transitory computer readable storage medium 1220, may be incorporated directly into the processor(s) 1202.

The propulsion mechanism controllers 1204 may communicate with the navigation system 1207 and adjust the rotational speed or other parameters of each propulsion mechanism to implement one or more modified control schemes, to stabilize the aerial vehicle, and/or to perform one or more maneuvers and guide the aerial vehicle along a flight path and/or to a safe landing location.

The navigation system 1207 may include a global positioning system (GPS), indoor positioning system (IPS), or other similar system and/or sensors that can be used to navigate the aerial vehicle to and/or from a location. The payload engagement controller 1212 communicates with the actuator(s) or motor(s) (e.g., a servo motor) used to engage and/or disengage items.

The control module 1213 may comprise or form a part of a flight controller that is configured to implement one or more modified control schemes described herein, such as emulating normal operation of a quadcopter, maintaining control using any and all remaining propulsion mechanisms, and/or tilting a coordinate frame of an aerial vehicle. Further, the control module 1213 may also be configured to control wingborn or horizontal flight of the aerial vehicle, VTOL flight of the aerial vehicle, and transitions between wingborn and VTOL flight orientations of the aerial vehicle. The control module 1213 may send and/or receive data to/from one or more sensors, such as imaging devices, an inertial measurement unit, accelerometers, gyroscopes, navigation sensors, or other sensors, and/or the control module 1213 may send and/or receive data to/from propulsion mechanism controllers 1204 associated with respective propulsion mechanisms. In some example embodiments, the control module 1213 may be integrated with or form a part of one or more of the processors 1202, the propulsion mechanism controllers 1204, and/or the navigation system 1207.

The network interface 1216 may be configured to allow data to be exchanged between the aerial vehicle control system 1200, other devices attached to a network, such as other computer systems (e.g., remote computing resources), and/or with aerial vehicle control systems of other aerial vehicles. For example, the network interface 1216 may enable wireless communication between the aerial vehicle and an aerial vehicle control system that is implemented on one or more remote computing resources. For wireless communication, an antenna of the aerial vehicle or other communication components may be utilized. As another example, the network interface 1216 may enable wireless communication between numerous aerial vehicles. In various implementations, the network interface 1216 may support communication via wireless general data networks, such as a Wi-Fi network. For example, the network interface 1216 may support communication via telecommunications networks, such as cellular communication networks, satellite networks, and the like.

Input/output devices 1217 may, in some implementations, include one or more displays, imaging devices, thermal sensors, infrared sensors, time of flight sensors, accelerometers, pressure sensors, weather sensors, etc. Multiple input/output devices 1217 may be present and controlled by the aerial vehicle control system 1200. One or more of these sensors may be utilized to implement the modified control schemes described herein, as well as to detect failures or faults, control wingborn or VTOL flight, effect transitions between wingborn and VTOL configurations, identify safe landing locations, and/or any other operations or functions described herein.

As shown in FIG. 12, the memory may include program instructions 1222, which may be configured to implement the example routines and/or sub-routines described herein. The data storage 1224 may include various data stores for maintaining data items that may be provided for implementing modified control schemes, determining flight paths, landing, identifying locations for disengaging items, determining which propulsion mechanisms to utilize to execute a maneuver, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1200 is merely illustrative and is not intended to limit the scope of the present disclosure. In particular, the computing system and devices may include any combination of hardware or software that can perform the indicated functions. The aerial vehicle control system 1200 may also be connected to other devices that are not illustrated, or instead may operate as a stand-alone system. In addition, the functionality provided by the illustrated components may, in some implementations, be combined in fewer components or distributed in additional components.

Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1200. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 1200 may be transmitted to the aerial vehicle control system 1200 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. A method to control an aerial vehicle, comprising:
detecting a failure of a first propulsion mechanism, the aerial vehicle comprising six propulsion mechanisms positioned around a fuselage of the aerial vehicle;
responsive to the detected failure:
  implementing a modified control scheme of the aerial vehicle using at least one of: at least one control surface, or at least one of remaining five propulsion mechanisms of the six propulsion mechanisms; and
  prior to implementing the modified control scheme, transitioning the aerial vehicle from wingborn flight to vertical takeoff and landing (VTOL) flight using at least one of: the at least one control surface, or the at least one of the remaining five propulsion mechanisms;
identifying a safe landing location for the aerial vehicle; and
navigating the aerial vehicle to the safe landing location using the modified control scheme;
wherein the modified control scheme comprises:
  causing stopping of the first propulsion mechanism during flight of the aerial vehicle; and
  causing stopping of a second propulsion mechanism during flight of the aerial vehicle, the second propulsion mechanism being positioned on an opposite side of the fuselage of the aerial vehicle from the first propulsion mechanism.

2. The method of claim 1, further comprising:
responsive to the detected failure:
  determining that the aerial vehicle is in wingborn flight;
  determining that the aerial vehicle is to continue in wingborn flight before transitioning to VTOL flight; and
  continuing wingborn flight of the aerial vehicle using at least one of: the at least one control surface, or the at least one of the remaining five propulsion mechanisms.

3. The method of claim 1, further comprising:
responsive to the detected failure:
determining that the aerial vehicle is in wingborn flight; and
determining that the aerial vehicle is to transition from wingborn flight.

4. A method to control an aerial vehicle, comprising:
detecting a failure of a first propulsion mechanism, the aerial vehicle comprising six propulsion mechanisms;
responsive to the detected failure, implementing a modified control scheme of the aerial vehicle using at least one of: at least one control surface, or at least one of remaining five propulsion mechanisms of the six propulsion mechanisms;
identifying a landing location for the aerial vehicle; and
navigating the aerial vehicle to the landing location using the modified control scheme;
wherein the modified control scheme further comprises:
  causing stopping of the first propulsion mechanism;
  causing stopping of a second propulsion mechanism, the second propulsion mechanism being positioned on the aerial vehicle opposite the first propulsion mechanism; and
  reversing rotational directions of two of remaining four propulsion mechanisms of the six propulsion mechanisms such that a rotational direction of each of the remaining four propulsion mechanisms is opposite a rotational direction of adjacent propulsion mechanisms.

5. The method of claim 4, wherein the modified control scheme further comprises:
modifying pitches of blades of the two reversed propulsion mechanisms.

6. The method of claim 4, wherein the modified control scheme further comprises:
instructing the second propulsion mechanism to provide thrust for additional control.

7. The method of claim 1, wherein the modified control scheme further comprises:
instructing at least one of hover, pitch, roll, or yaw of the aerial vehicle using remaining four propulsion mechanisms of the six propulsion mechanisms.

8. The method of claim 7, wherein the modified control scheme further comprises:
instructing the second propulsion mechanism to compensate for at least one of coupled yaw or coupled roll.

9. The method of claim 7, wherein the modified control scheme further comprises:
modifying a coordinate frame of the aerial vehicle such that a net thrust of the remaining four propulsion mechanisms of the six propulsion mechanisms is substantially vertical.

10. An aerial vehicle, comprising:
a fuselage;
six propulsion mechanisms coupled to and positioned around the fuselage; and
a controller configured to at least:
detect a failure of a first propulsion mechanism of the six propulsion mechanisms;
responsive to the detected failure, implement a modified control scheme of the aerial vehicle using at least one of: at least one control surface, or at least one of remaining five propulsion mechanisms of the six propulsion mechanisms;
identify a landing location for the aerial vehicle; and
navigate the aerial vehicle to the landing location using the modified control scheme;
wherein the modified control scheme comprises:
causing stopping of the first propulsion mechanism during flight of the aerial vehicle;
causing stopping of a second propulsion mechanism during flight of the aerial vehicle, the second propulsion mechanism being positioned on an opposite side of the fuselage of the aerial vehicle from the first propulsion mechanism; and
reversing rotational directions of two of remaining four propulsion mechanisms of the six propulsion mechanisms such that a rotational direction of each of the remaining four propulsion mechanisms is opposite to a rotational direction of adjacent propulsion mechanisms.

11. The aerial vehicle of claim 10, wherein the six propulsion mechanisms are angled such that each propulsion mechanism produces a force that includes a horizontal component and a vertical component when the aerial vehicle is in a vertical takeoff and landing (VTOL) orientation.

12. The aerial vehicle of claim 10, wherein the modified control scheme further comprises at least one of:
modify pitches of blades of the two reversed propulsion mechanisms;
instruct the second propulsion mechanism to provide thrust for additional control;
modify a coordinate frame of the aerial vehicle such that a net thrust of the remaining four propulsion mechanisms of the six propulsion mechanisms is substantially vertical; or
instruct at least one of hover, pitch, roll, or yaw of the aerial vehicle using the remaining five propulsion mechanisms of the six propulsion mechanisms.

13. A method to control an aerial vehicle, comprising:
detecting a failure of a first propulsion mechanism, the aerial vehicle consisting of six propulsion mechanisms;
responsive to the detected failure:
implementing a modified control scheme of the aerial vehicle using at least one of: at least one control surface, or at least one of remaining five propulsion mechanisms of the six propulsion mechanisms; and
prior to implementing the modified control scheme, transitioning the aerial vehicle from wingborn flight to vertical takeoff and landing (VTOL) flight using at least one of: the at least one control surface, or the at least one of the remaining five propulsion mechanisms;
identifying a landing location for the aerial vehicle; and
navigating the aerial vehicle to the landing location using the modified control scheme.

14. The method of claim 13, wherein the modified control scheme further comprises:
causing stopping of the first propulsion mechanism during flight of the aerial vehicle.

15. The method of claim 14, wherein the modified control scheme further comprises:
causing stopping of a second propulsion mechanism during flight of the aerial vehicle, the second propulsion mechanism being positioned on the aerial vehicle opposite the first propulsion mechanism.

16. The method of claim 15, wherein the modified control scheme further comprises:
reversing rotational directions of two of remaining four propulsion mechanisms of the six propulsion mechanisms such that a rotational direction of each of the remaining four propulsion mechanisms is opposite a rotational direction of adjacent propulsion mechanisms.

17. The method of claim 16, wherein the modified control scheme further comprises:
modifying pitches of blades of the two reversed propulsion mechanisms.

18. The method of claim 15, wherein the modified control scheme further comprises:
modifying a coordinate frame of the aerial vehicle such that a net thrust of the remaining four propulsion mechanisms of the six propulsion mechanisms is substantially vertical.

* * * * *